United States Patent
Burrows et al.

(10) Patent No.: US 7,387,210 B2
(45) Date of Patent: Jun. 17, 2008

(54) FILTER CARTRIDGE AND MANIFOLD FOR A WATER PURIFICATION SYSTEM

(75) Inventors: Bruce D. Burrows, Valencia, CA (US); David B. Chaney, Westerville, OH (US); Louis M. Busick, Westerville, OH (US)

(73) Assignee: Zohar Waterworks, LLC, Charlotte, NC (US)

( * ) Notice: Subject to any disclaimer, the term of this patent is extended or adjusted under 35 U.S.C. 154(b) by 226 days.

(21) Appl. No.: 11/281,316

(22) Filed: Nov. 16, 2005

(65) Prior Publication Data

US 2006/0113240 A1   Jun. 1, 2006

(51) Int. Cl.
*B01D 29/00* (2006.01)
*B01D 29/88* (2006.01)
*B01D 35/00* (2006.01)

(52) U.S. Cl. .................. 210/443; 210/117; 210/136; 210/232; 210/236; 210/240; 210/418; 210/420; 210/444

(58) Field of Classification Search ................ 210/117, 210/136, 232, 236, 249, 418, 420, 421, 423, 210/440, 443, 444, 459
See application file for complete search history.

(56) References Cited

U.S. PATENT DOCUMENTS

| | | | |
|---|---|---|---|
| 5,045,197 A | 9/1991 | Burrows | |
| 5,101,850 A | 4/1992 | Todd | |
| 5,435,909 A | 7/1995 | Burrows | |
| 5,591,332 A | 1/1997 | Reid et al. | |
| 5,744,030 A | 4/1998 | Reid et al. | |
| 5,826,854 A * | 10/1998 | Janvrin et al. | 251/149.9 |
| 6,776,906 B2 * | 8/2004 | Reid | 210/232 |
| 6,800,199 B1 * | 10/2004 | Rhee | 210/232 |
| 6,843,912 B2 * | 1/2005 | Chaney et al. | 210/234 |
| 2002/0125183 A1 | 9/2002 | Chaney et al. | |
| 2003/0102257 A1 | 6/2003 | Reid | |
| 2003/0217958 A1 | 11/2003 | Reid | |

FOREIGN PATENT DOCUMENTS

WO     WO0183079 A1   11/2001

* cited by examiner

*Primary Examiner*—John Kim
(74) *Attorney, Agent, or Firm*—Standley Law Group LLP

(57) ABSTRACT

A combined filter cartridge and manifold for use in a water purification system or the like, to facilitate substantially drip-free filter cartridge removal and replacement. The filter cartridge includes water inlet and outlet ports for respective connection with inlet and outlet fittings on the manifold. A pivoting manifold cap normally overlies and retains the filter cartridge in connected relation with the manifold fittings and a water supply coupled to the manifold. Pivoting movement of the manifold cap toward an open position shuts off the water supply and then permits filter cartridge separation from the manifold, with check valves at the manifold inlet/outlet fittings and cartridge inlet/outlet ports preventing significant water leakage. Upon installation of a replacement filter cartridge and return movement of the manifold cap to the initial closed position, cam elements on the manifold cap and filter cartridge draw the cartridge inlet/outlet ports into secure slide-on connection with the manifold inlet/outlet fittings before resuming connection with the water supply.

21 Claims, 14 Drawing Sheets

FILTER CARTRIDGE AND MANIFOLD FOR A WATER PURIFICATION SYSTEM

This application claims the benefit of U.S. Provisional Application 60/541,844, filed Feb. 3, 2004.

BACKGROUND OF THE INVENTION

This invention relates generally to water purification systems of the type having one or more filter elements for producing a supply of filtered or relatively purified water, wherein the filter elements are supported by a filter manifold for relatively quick and easy removal and replacement. More particularly, this invention relates to an improved water purification system wherein each filter cartridge is adapted for removal and replacement in a substantially fail-safe manner, with little or no risk of undesired water spillage in the course of filter cartridge changeover, or from a removed filter cartridge.

Water purification systems are generally well known in the art for producing a relatively purified water supply used for drinking, cooking, etc. Such purification systems commonly employ one or more filter elements connected to an incoming water supply such as a standard tap water inflow. The filter elements appropriately filter or otherwise purify the water inflow to produce a relatively purified water supply which may be coupled directly to a faucet valve or the like for immediate dispensing, or otherwise coupled to a reservoir where it is stored pending dispensing demand. In one common configuration, the purification system comprises a plurality of filter elements including particulate filtration, carbon filtration, and a reverse osmosis (RO) membrane supported on or in a manifold constructed for suitably connecting each filter element to mating flow couplers for normal purification operation, while additionally accommodating relatively quick and easy removal and replacement of each filter element. See, for example, U.S. Pat. Nos. 5,045,197; 5,435,909; 5,591,332; and 5,744,030, which are incorporated by reference herein. Such purification systems have been designed for under-counter installation in association with a kitchen sink or the like, or in a stand-alone so-called point-of-use water cooler.

In water purification systems of the type described above, removal and replacement of each filter element is required on a periodic basis to maintain the quality of the produced purified water. The manifold filter element geometry is designed to facilitate filter element changeover, while insuring that each replacement filter element is properly connected for flow-through water passage at the correct location. However, before any one of the filter elements is removed from the manifold, it is first necessary to turn off the incoming water flow. Unfortunately, shutting off the incoming water flow requires the user to locate and properly operate an inflow shut-off valve before a filter element is removed. Many prior manifold systems designed for quick and easy filter element changeover have not provided any means for safeguarding against undesired filter element removal before the incoming water supply is turned off. In this regard, filter element removal without first turning off the water supply can result in significant water leakage and potential damage to adjoining flooring materials and the like.

Some recent water purification systems have been designed for water supply shut-off, before permitting removal and replacement of a filter cartridge. See, for example, U.S. Patent Application Publication US 2002/0125183 A1, which is also incorporated by reference herein. See also U.S. Pat. Nos. 5,591,332; and 5,744,030; and U.S. Patent Application Publication US 2003/0102257 A1.

The present invention is directed to further improvements in and to a combined replaceable filter cartridge and manifold, wherein the filter cartridge is adapted for quick and easy, substantially fail-safe removal from and installation onto the manifold, and further wherein such filter cartridge removal and replacement occurs substantially in the absence of water spillage from the manifold or from a removed filter cartridge.

SUMMARY OF THE INVENTION

In accordance with the invention, a combined filter cartridge and manifold are provided for use in a water purification system or the like, to facilitate substantially fail-safe and substantially drip-free filter cartridge removal and replacement. The manifold is coupled to a suitable water supply and includes inlet and outlet fittings for quick and easy respective connection with water inlet and outlet ports on the filter cartridge. A pivotal manifold cap is mounted on the manifold for pivoting movement between a normal closed or lowered position overlying and retaining the filter cartridge in proper connected relation with the manifold fittings and the water supply, and an open or raised position for disconnection of the water supply before permitting filter cartridge separation from the manifold. Check valves at the cartridge inlet and outlet ports prevent water leakage from the removed cartridge. Upon installation of a replacement filter cartridge, the manifold cap is returned to the initial closed position, with cooperating cam elements on the manifold cap and filter cartridge drawing the cartridge inlet/outlet ports into secure connection with the manifold inlet/outlet fittings before re-connection with the water supply.

In one preferred construction, the manifold includes a support bracket adapted for wall mounting at an under-counter location or the like, and including a pair of bracket arms for seated support of a pair of cam pins projecting outwardly from opposed sides of the filter cartridge. Positioning of a filter cartridge with said cam pins supported on the bracket arms orients the cartridge inlet/outlet ports in alignment with the manifold inlet/outlet fittings for correct, substantially fail-safe flow coupling therewith. The cartridge inlet/outlet check valves are adapted to open upon connection with the manifold inlet/outlet fittings, and to close upon separation therefrom. When the manifold cap is in the raised or open position, the support bracket is sufficiently exposed for filter cartridge removal and replacement relative to the bracket arms. Upon displacement of the manifold cap toward the lowered or closed position, a cam track defined by the manifold cap engages the cartridge cam pins to carry the cartridge inlet/outlet ports into proper and secure flow-coupled connection with manifold inlet/outlet fittings, followed by opening connection with the water supply. In this lowered or closed position, the manifold cap overlies at least the portion of the filter cartridge including the inlet/outlet ports and the associated manifold inlet/outlet fittings to positively block and prevent filter cartridge removal from the manifold.

To remove the filter cartridge for replacement, the manifold cap is shifted upwardly to its raised or open position. Such displacement of the manifold cap initially shuts off the water supply connected to the manifold. Further manifold cap displacement sufficiently exposes the filter cartridge for manual removal or separation from the manifold.

In one alternative preferred form, the cooperating cam elements on the pivotal manifold cap and filter cartridge accommodate swinging movement of the filter cartridge with the pivotally mounted manifold cap between an inoperative position with the cartridge extending generally downwardly and angularly outwardly from the support bracket, and an operative position with the cartridge suspended generally vertically from the support bracket. In the inoperative position, the water supply valve is disconnected from the filter cartridge which can be disassembled from or a replacement filter cartridge can be assembled with the manifold inlet/outlet fittings. By holding the filter cartridge in the inoperative position with the inlet/outlet ports properly engaged with the manifold inlet/outlet fittings, the cam elements accommodate swinging movement of the filter cartridge held manually swung toward the operative position to reconnect the water supply and releasibly lock the filter cartridge in place.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
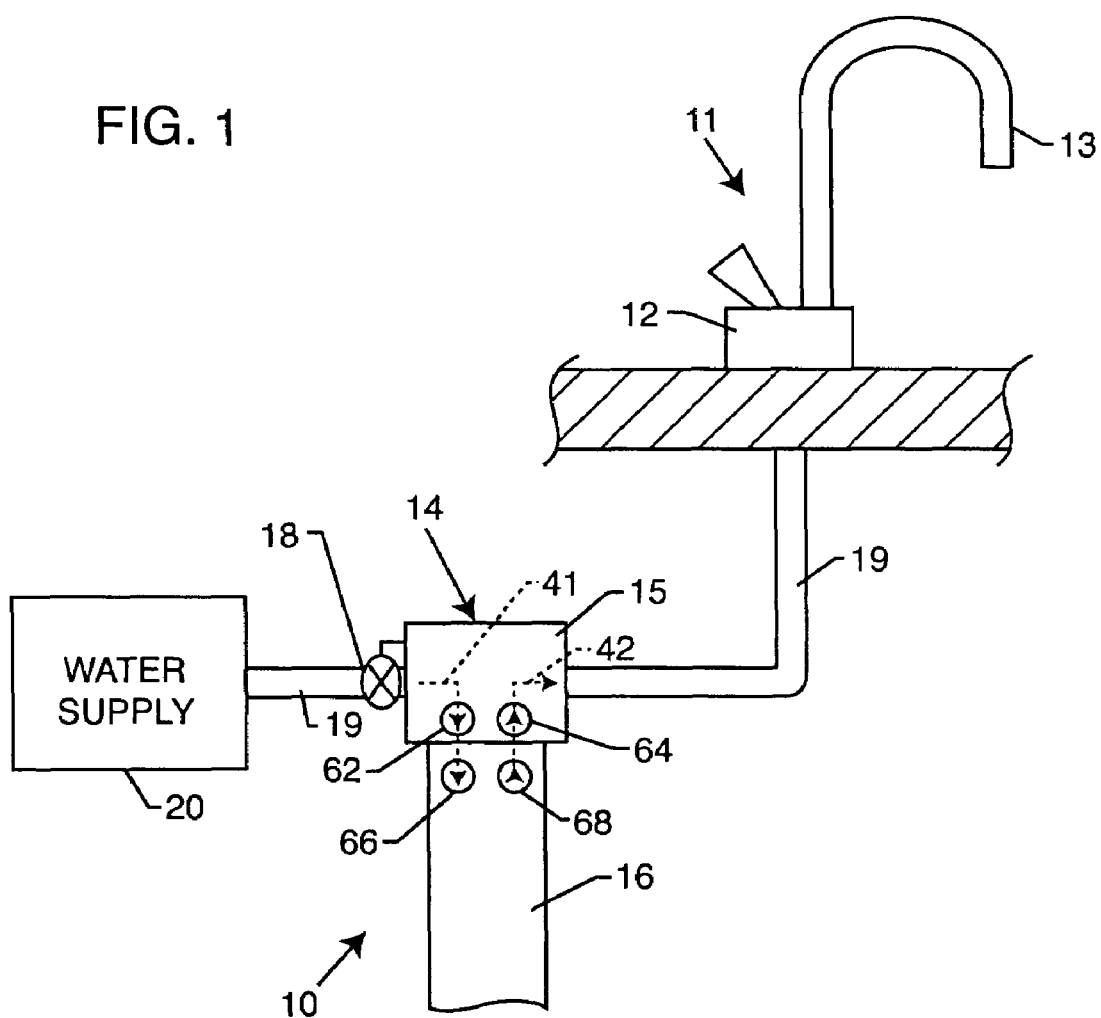
FIG. 1 is a schematic diagram illustrating a combined filter cartridge and manifold in a water purification system.
Figure 2:
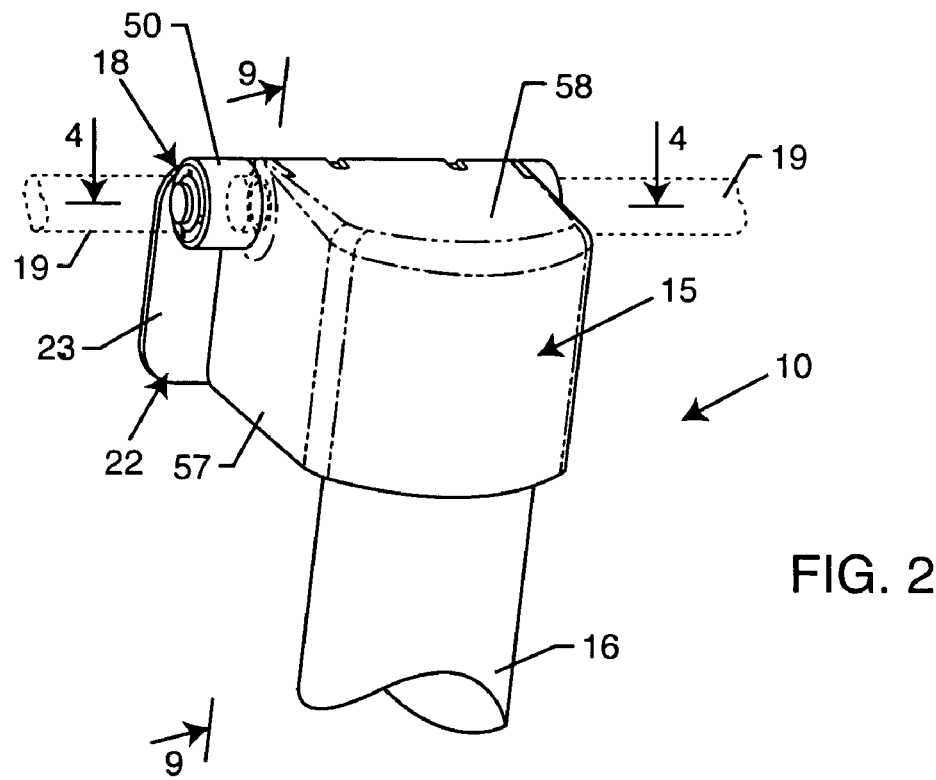
FIG. 2 is an enlarged and fragmented front perspective view of a portion of the filter cartridge and manifold of FIG. 1, depicting a pivotally mounted manifold cap in a closed or lowered position supporting and retaining a filter cartridge in a normal operating position for filtering water.
Figure 3:
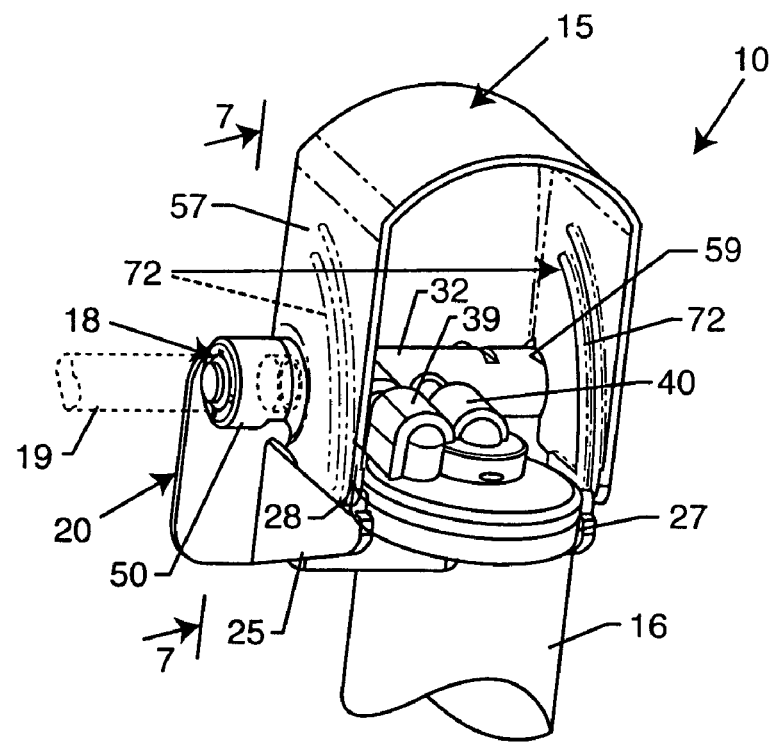
FIG. 3 is an enlarged and fragmented front perspective view corresponding generally with FIG. 2, but showing the manifold cap is an open or raised position permitting filter cartridge removal and replacement.
Figure 7:
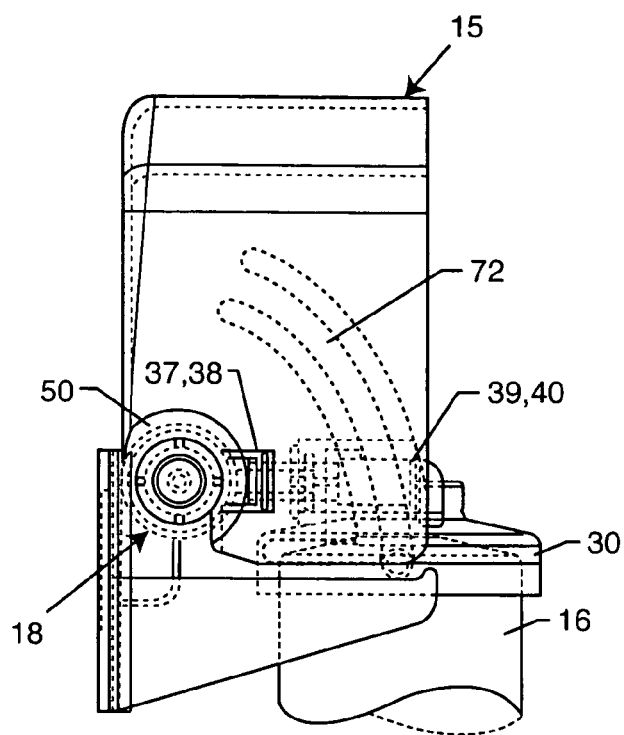
FIG. 7 is a fragmented side elevation view taken generally on the line 7-7 of FIG. 3, and illustrating the manifold cap in the open or raised position.
Figure 9:
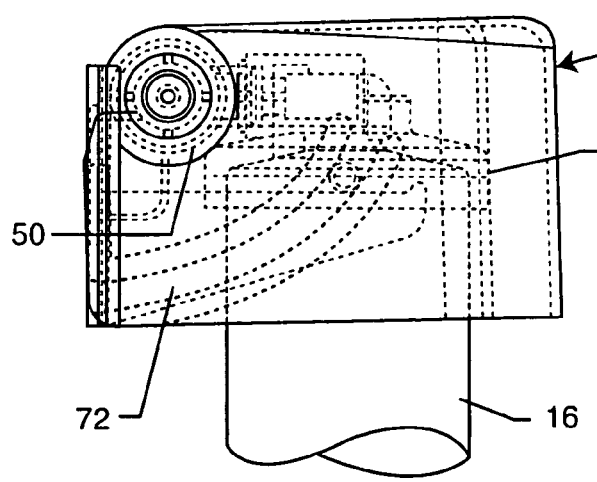
FIG. 9 is a fragmented side elevation view similar to FIGS. 7 and 8, taken generally on the line 9-9 of FIG. 2, and showing the manifold cap in the closed or lowered position.

As shown in the exemplary drawings, a combined filter cartridge and manifold system referred to generally in FIG. 1 by the reference numeral 10 is provided for providing relatively purified water for dispensing by means of a faucet 11 or the like including (as shown) a suitable faucet valve 12 for regulating dispense water flow through a faucet spout 13 or the like. The cartridge and manifold system 10 includes a manifold 14 having a pivotally movable manifold cap 15 for normally retaining and supporting a removable filter cartridge 16 to produce purified water for dispensing, as viewed in FIGS. 2 and 9. The manifold cap 15 can be raised from a normally closed position (FIGS. 2 and 9) to an open position (FIGS. 3 and 7) initially closing a water supply valve 18 and then exposing and releasing the filter cartridge 16 for quick and easy removal and replacement. The manifold 14 and the filter cartridge 16 includes one-way check valves which close upon cartridge removal from the manifold 14, whereby the filter cartridge 16 can be removed and replaced in a substantially drip-free manner.

FIG. 1 depicts the combined filter cartridge and manifold system 10 mounted in-line along the length of a water supply conduit or tube 19 having an upstream segment coupled to a suitable water supply 20, such as a conventional tap water source or supply, and a downstream segment coupled in flow communication with the faucet 11 for water dispensing. A single filter cartridge 16 is shown supported by the manifold 14, wherein this filter cartridge 16 may include a suitable filtration medium or media (not shown) for removing particulate and/or undesired potentially toxic liquid agents from the water flow stream. Persons skilled in the art will recognize and appreciate that multiple filter cartridges may be used in a common manifold arrangement, with supporting manifold structure being adapted for water flow in series through such multiple filter cartridges. One exemplary multi-cartridge manifold arrangement is shown and described in U.S. Patent Application Publication No. US 2002/0125183 A1, which is incorporated by reference herein. Persons skilled in the art will recognize further that the relatively purified water outflow from one or more filter cartridges 16 of the type depicted in FIG. 1 may be supplied to a storage reservoir (also not shown) where such water is available for immediate on-demand dispensing by means of the faucet 11 or the like.

As shown in FIGS. 2-9 with respect to one preferred form of the invention, the manifold 14 further comprises a manifold support bracket 22 formed from lightweight molded plastic or the like and having a rear bracket plate 23 (shown best in FIG. 6) adapted for convenient mounting onto a selected wall or other substrate (not shown) as by means of a suitable adhesive layer carried on a rear face thereof. Alternative fastening means such as one or more screws (not shown) may also be used for rearward fastening through screw ports 24 formed in the plate 23. A pair of laterally spaced-apart bracket arms 25 project outwardly or forwardly from a front side of the bracket plate 23. The upper surfaces or edges 26 of these bracket arms 25 define an upwardly presented pair of cam rails, the outboard or distal ends of which include relatively short up-turned stops 27. These cam rails 26, defined by the spaced-apart bracket arms 25, are oriented generally in parallel with each other for slidably supporting a pair of cam lugs or pins 28 projecting laterally outwardly from opposite sides of a header 30 mounted on the upper end of each filter cartridge 16, as will be described herein in more detail.

The manifold 14 further includes a valve body 32 adapted for in-line mounting along the length of the water supply flow conduit or tube 19. This valve body 32 (FIG. 5) comprises a tubular structure which may also be formed from a lightweight molded plastic or the like and includes a downwardly protruding bracket card 33 having a size and shape for relatively close-fit sliding reception into an upwardly open rear pocket 34 (FIG. 6) defined by a forwardly offset central segment of the wall-mounted manifold bracket plate 23. A pair of forwardly projecting guide flanges 35 on the bracket card 33 conveniently slide-fit into upwardly open slots 36 in the bracket plate 23 for securely retaining these components in assembled relation, while permitting upward slide-out removal of the valve body 32 from the bracket plate 23, when and if desired. When mounted onto the rear bracket plate 23, the valve body 32 is oriented to extend generally horizontally or laterally across a front side of the bracket plate 23.

Figure 4:
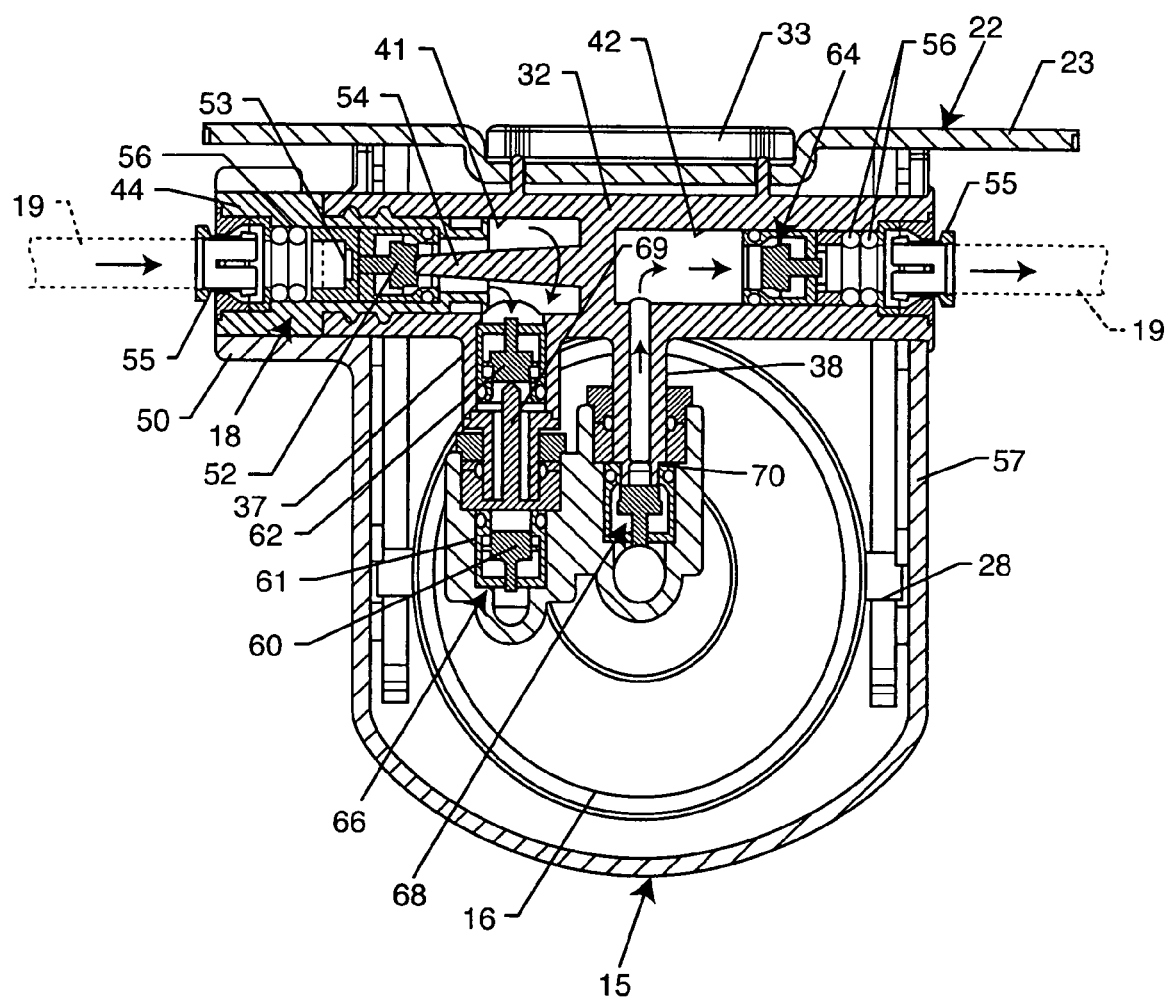
FIG. 4 is an enlarged horizontal sectional view taken generally on the line 4-4 of FIG. 2.
Figure 5:
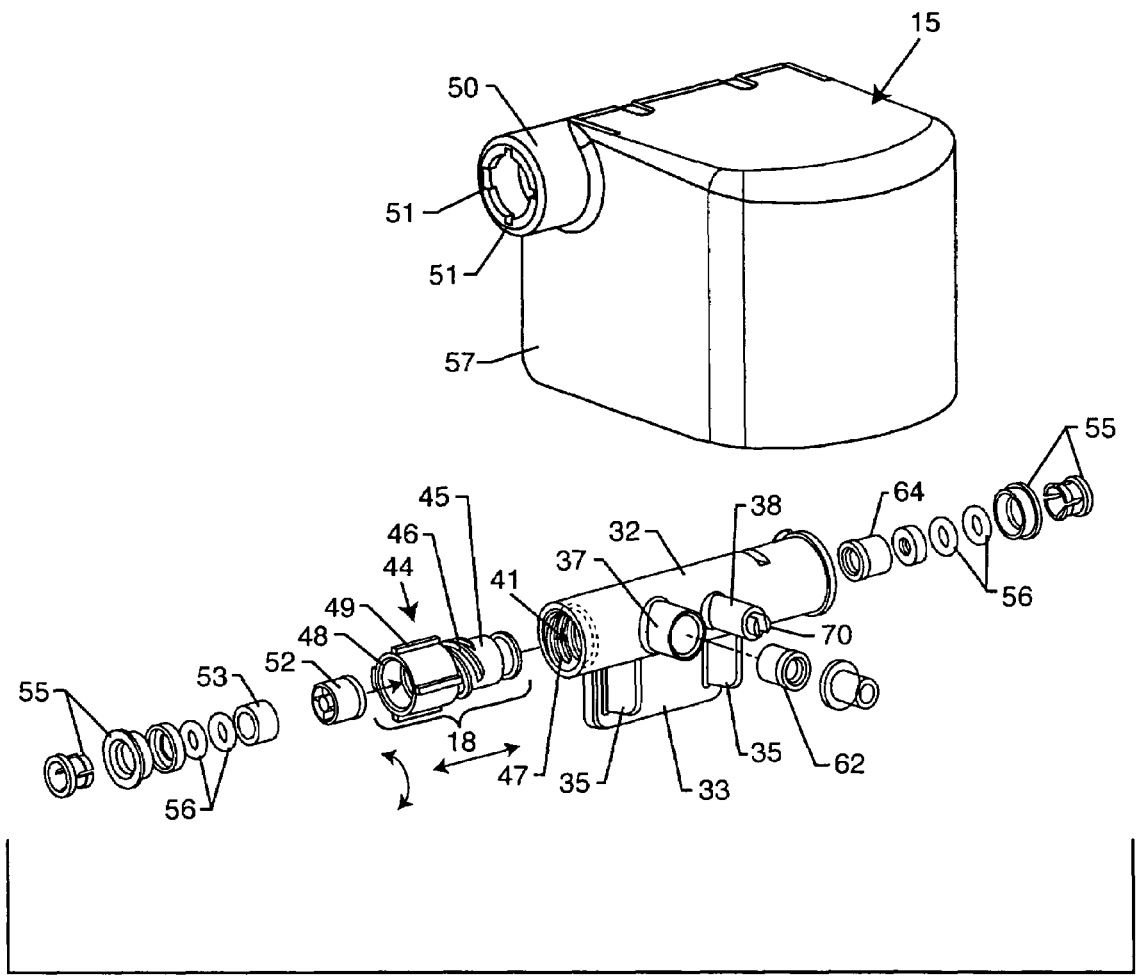
FIG. 5 is an exploded perspective view showing the manifold cap and associated manifold components.
Figure 6:
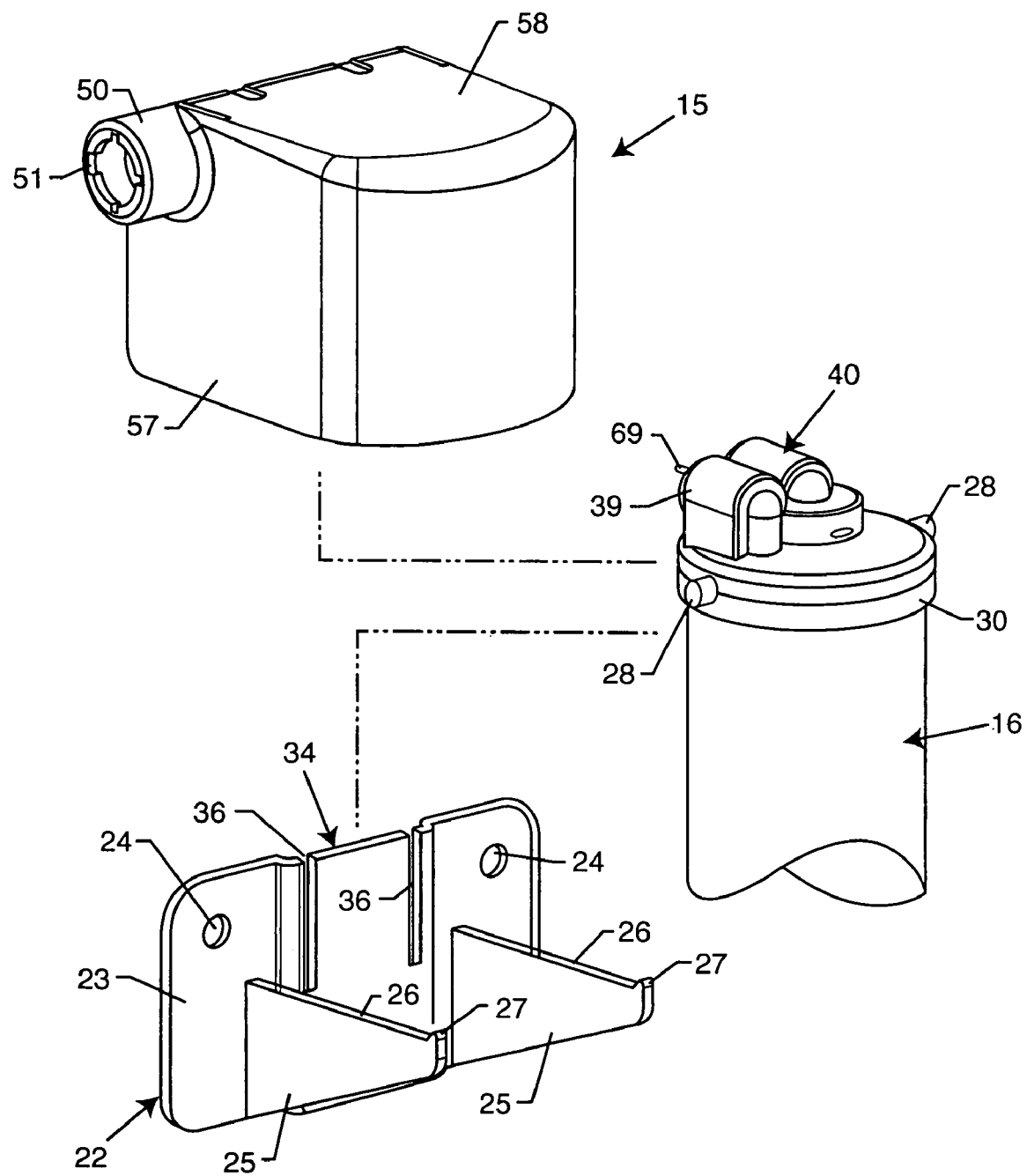
FIG. 6 is an exploded perspective view illustrating the manifold cap and a support bracket in exploded relation with a filter cartridge.

The valve body 32 includes a pair of forwardly protruding tubular fittings comprising an inlet fitting 37 and an outlet fitting 38 (FIG. 5) adapted for respective slide-fit coupling with a tubular inlet port 39 and outlet port 40 (FIG. 6) on the head 30 of the removable filter cartridge 16. FIGS. 4-5 illustrate the inlet and outlet fittings 37, 38 projecting radially outwardly or forwardly and in spaced-apart, generally parallel relation on the valve body 32. As viewed best in FIG. 4, the inlet fitting 37 is adapted for connection via an inlet bore 41 in the valve body 32 to the incoming water flow from the water supply 20, whereas the outlet fitting 38 is adapted for connection via an outlet bore 42 in the valve body 32 to the faucet 11 or the like.

The valve body 32 carries the water supply valve 18 generally at an upstream end of the inlet bore 41 for appropriate on-off movement for respectively permitting and preventing water flow into and through the manifold 14 and associated filter cartridge 16 mounted thereon. More particularly, as shown best in FIG. 5, the illustrative water supply valve 18 comprises a tubular valve member 44 having an insert segment 45 with an external or male thread 46 formed thereon for part-turn thread-in engagement with a mating internal or female thread 47 formed within the inlet bore 41 at the upstream end thereof. An outboard head segment 48 (FIG. 5) of the valve member 44 includes one or more axially elongated external drive keys 49 protruding radially outwardly therefrom for axial slide-fit reception into a cylindrical drive hub 50 on the manifold cap 15, wherein this drive hub 50 has matingly shaped internal slotted keyways 51 formed therein. With this construction, rotation of the manifold cap 15 relative to the manifold valve body 32, upon raising and lowering of the manifold cap 15 (FIGS. 2 and 3) as will be further described, the drive hub 50 on the cap 15 rotatably engages and drives the head segment 48 for correspondingly advancing and retracting the threaded insert segment 45 through an incremental axial stroke, relative to the valve body 32.

The tubular valve member 44 has a check valve assembly mounted therein, including a resilient valve head 52 mounted therein for engaging and closing an annular valve seat 53 to prevent water inflow from the water supply 20 through the manifold inlet bore 41 to the manifold inlet fitting 37, thereby preventing water flow to and through the filter cartridge 16 when connected with the manifold 14. In this regard, rotation of the manifold cap 15 in one direction rotatably displaces the valve member 44 to a closed position with the valve seat 53 axially advanced into seated engagement with an upstream surface of the valve head 52. Conversely, rotation of the manifold cap 15 in an opposite direction rotatably displaces the valve member 44 to an open position with the valve seat 53 axially retracted from the valve head 52 to permit water flow to the inlet fitting 37 and the filter cartridge 16 coupled thereto. FIG. 4 illustrates the valve seat 53 in this axially retracted or open position, with water pressure at an upstream side of the water supply valve 18 functioning to urge and retain the valve head 52 against a stop pin 54 which protrudes axially in an upstream direction within the inlet bore 41.

The water supply tube or conduit 19 is conveniently coupled to the manifold 14 by means of a pair of collet-style couplers 55, one of which is mounted at an upstream end of the tubular valve member 44, in association with an axially-downstream adjacent pair of O-ring seals 56. A second one of the collet-style couplers 55 is mounted at a downstream end of the outlet bore 42 formed in the valve body 32, in association with an axially-upstream adjacent pair of O-ring seals 56. These collet-style couplers 55 are designed for quick and easy push-in or slide-fit gripped reception and retention of the associated end of the water supply tube 19, particularly in the case where this supply tube 19 comprises a length of plastic tubing. Such collet-style push-fit couplers are known in the art, and are shown and described by way of example in more detail in U.S. Pat. No. 4,005,883, which is incorporated by reference herein. Alternative means for coupling the water supply line 19 to the manifold 14 will also be apparent to persons skilled in the art.

As noted previously, the manifold cap 15 includes the internally slotted drive hub 50 which is slidably fitted over and rotatably displaces the externally keyed head segment 48 of the tubular valve member 44. As best illustrated in FIGS. 2-6, this drive hub 50 protrudes outwardly from one side of a depending cap side wall 57 which is joined in turn with a top wall 58, thereby providing the manifold cap 15 with a downwardly open or inverted, generally cup-shaped configuration. An aperture 59 is also formed in the cap side wall 57 (shown best in FIG. 3) opposite the drive hub 50, whereby the manifold cap can be pivotally shifted between a lowered position (FIG. 2) and a raised position (FIG. 3) through a rotary angle of about 90°. Such pivoting movement of the manifold cap 15 is effective to rotatably shift the water supply valve 18 between an open position when the cap 15 is in the lowered position (FIG. 2) extending generally over to cover and conceal the inlet and outlet fittings 37, 38 on the manifold valve body 32, and a closed position when the cap 15 is in the raised position (FIG. 3) exposing the inlet and outlet fittings 37, 38 to access.

The manifold 14 and the filter cartridge 16 both include one-way check valves which close upon cartridge removal from the manifold 14, whereby the filter cartridge 16 can be removed and replaced in a substantially drip-free manner. Conversely, upon cartridge installation onto the manifold 14, with the manifold inlet and outlet ports 37, 38 in proper flow-coupled engagement with the cartridge inlet and outlet ports 39, 40, these check valves are opened to permit flow of water through the filter cartridge 16 for appropriate purification. In particular, when the fittings 37, 38 are properly coupled with the ports 39, 40, and when the water supply valve 18 is opened, water is permitted to flow from the water supply 20 and through the manifold inlet bore 41 and into the filter cartridge via the inlet port 39. This water flow continues within the filter cartridge 16 in a known manner, in association with the purification media therein, and eventual exit flow via the outlet port 40 through the manifold outlet bore 42 to the faucet 11 or the like for dispensing.

Each of the inlet and outlet fittings 37, 38, and each of the inlet and outlet ports 38, 39 is associated, in the illustrative preferred form of the invention, with a respective one of a plurality of these check valves, wherein each of these check valves generally includes a resilient valve head 60 positioned for movable displacement between open and closed positions relative to an associated annular valve seat 61. However, the orientations of these check valves in the fittings 37, 38 and ports 39, 40 are selected for the desired one-way operation to permit water flow in one direction, but to prevent water back-flow in an opposite direction, in response to installation and removal of the filter cartridge 16 relative to the manifold 14.

More particularly, a first manifold check valve 62 is positioned within the inlet fitting 37 and oriented for pressure-actuated movement to a normally closed position prevent water flow from the associated inlet bore 41 in a direction outwardly from said inlet fitting 37. A second manifold check valve 64 is positioned within the outlet bore 42 in flow communication with the outlet fitting 38, and is oriented for pressure-actuated movement relative to the associated valve seat 61 to permit water outflow from the outlet bore 42 toward the faucet 11 or the like, while preventing water back-flow therethrough. Accordingly, when a filter cartridge is not coupled with the manifold inlet and outlet fittings 37, 38, the associated first and second manifold check valves 62, 64 positively prevent water outflow from either fitting 37,38 irrespective of the opened or closed position of the water supply valve 18.

A first cartridge check valve 66 is positioned within the inlet port 39 of the filter cartridge 16 and oriented for pressure-actuated movement to permit water inflow through the inlet port and into the interior of the filter cartridge. Conversely, this first cartridge check valve positively prevents water outflow from the filter cartridge through the inlet port 38. A second cartridge check valve 68 is mounted within the outlet port 40 of the filter cartridge and is oriented for pressure-actuated movement for normally preventing water outflow through the outlet port 40 to the cartridge exterior. Accordingly, when the filter cartridge inlet and outlet ports 38, 40 are not coupled with the manifold inlet and outlet fittings 37, 38, the associated first and second cartridge check valves 66, 68 positively prevent water outflow from either port 39, 40. Thus, following removal of a used cartridge 16 from the manifold 14 as will be described further herein, the first and second cartridge check valves 66, 68 positively prevent significant water leakage from the interior of the filter cartridge.

When the filter cartridge 16 is mounted onto the manifold 14, with the inlet and outlet ports 39, 40 in flow-coupled relation with the manifold inlet and outlet fittings 37, 38, an actuator pin or probe 69 carried by the inlet port 39 and protruding outwardly a short distance therefrom engages the first manifold check valve 62 to displace said check valve to an open position permitting water from the manifold inlet bore 41 and through the cartridge inlet port 39 into the filter cartridge interior. Accordingly, provided that the water supply valve 18 has been opened by appropriate movement of the manifold cap 15, the first manifold check valve 62 is thus opened and the resultant water flow and pressure at an upstream side of the first cartridge check valve 66 shifts that check valve to an open position too.

At the same time, an annular nipple or stem 70 at the distal end of the manifold outlet fitting 38 engages the second cartridge check valve 68 to shift that check valve to an open position. As a result, water outflow from the filter cartridge 16 via the outlet port 40 is permitted. Such water outflow passes through the manifold outlet fitting 38 and the manifold outlet bore 42 for pressure-actuated opening of the second manifold check valve 64. Accordingly, the water outflow may continue from the manifold outlet bore 42 through the water supply tubing 19 to the faucet valve 12.

Mounting of the filter cartridge 16 with the inlet and outlet ports 39, 40 thereof in properflow-coupled relation with the manifold inlet and outlet fittings 37, 38 is coordinated by the pivoting manifold cap 15 with appropriate opening and closing movement of the water supply valve 18. More particularly, as previously noted herein, when the manifold cap 15 is lifted to the raised position as viewed in FIGS. 3 and 7, the water supply valve 18 is turned off. In this cap position, the upper end of the filter cartridge 16 (if connected with the manifold) is exposed for convenient manual grasping and simple removal from the manifold 14 by slide-off or slide-away disengagement of the cartridge inlet and outlet ports 39, 40 from the associated manifold inlet and outlet fittings 37, 38. As previously described, residual water remaining within the removed filter cartridge 16 is precluded from dripping or spilling from the cartridge by the closed states of the two cartridge check valves 66, 68. A replacement filter cartridge 16 can be oriented with its inlet and outlet ports 39, 40 for convenient slide-on engagement with the manifold inlet and outlet fittings 37, 38, followed by downward closure of the manifold cap 15 as viewed in FIGS. 2 and 9. Such downward movement of the manifold cap 15 is accompanied by re-opening of the water supply valve 18 for resumed water flow through the filter cartridge.

Proper filter cartridge mounting onto the manifold is facilitated and assured by a pair of cam slotted tracks 72 formed on the mounting cap 15 at opposite inboard-positioned sides thereof. These slotted cam tracks have a generally matching arcuate or curved shape, and are appropriately sized and positioned to receive and guidingly engage the cam pins 28 projecting outwardly from opposite sides of the head 30 on the filter cartridge 16 as the manifold cap 15 is pivotally shifted between the lowered and raised positions shown respectively in FIGS. 2 and 3.

Figure 8:
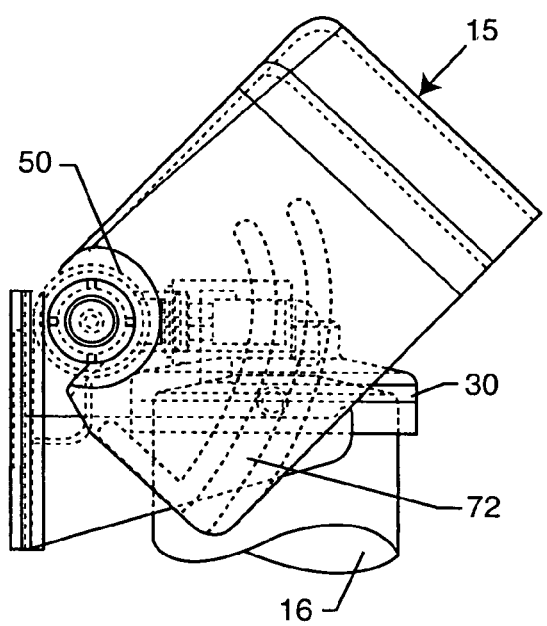
FIG. 8 is a fragmented side elevation view similar to FIG. 7, but showing the manifold cap in a partially raised position approximately mid-way between the open and closed positions.

In particular, with the manifold cap 15 in the raised position (FIGS. 3 and 7) with the water supply valve 18 in the closed position, a replacement filter cartridge 16 is installed onto the manifold 14 by initially positioning the cartridge with the cam pins 28 resting upon the cam rails 26 defined by the pair of bracket arms 25. In this position, the pair of cam pins 28 are generally and respectively positioned in slide-fit alignment with the pair cam tracks 72 on the manifold cap 15. Then, downward pivoting motion of the manifold cap causes the cam tracks 72 to engage and carry the cam pins 28 along the cam rails 30 to correspondingly carry the cartridge inlet and outlet ports 39, 40 into correct slide-fitted and flow coupled engagement with the manifold inlet and outlet fittings 37, 38. Such initial movement of the filter cartridge 16 into correct slide-on flow-coupled engagement with the manifold fittings 37, 38 is depicted in FIG. 8. As the manifold cap 15 is further rotated downwardly toward the lowered position as viewed in FIGS. 2 and 9, the cap 15 shifts the water supply valve 18 to the open position and the filter cartridge is thus rendered operational. In this configuration, the manifold cap 15 protectively overlies and substantially conceals the upper end of the filter cartridge 16 from access and view, while additionally wrapping relatively closely about a forward side of the filter cartridge to physically obstruct and prevent cartridge separation from the manifold.

Upon subsequent return movement of the manifold cap 15 toward the raised position, the water supply valve 18 is initially turned off followed by partial retraction of the cartridge inlet and outlet ports 39, 40 from the manifold inlet and outlet fittings 37, 38 as the cam pins 28 ride along the upwardly shifting cam tracks 72 on the manifold cap. As the manifold cap 15 nears or reaches the elevated position shown in FIGS. 3 and 7, the upper end of the filter cartridge 16 is sufficiently exposed for quick and easy slide-off separation from the manifold 14, as previously described herein.

Accordingly, the embodiment depicted in FIGS. 1-9 provides a relatively simple and easily manipulated system for positively assuring that a water supply valve is turned off before a filter cartridge can removed for replacement. Moreover, upon proper removal of the filter cartridge, the check valves at the various manifold and cartridge fittings and ports positively prevent any significant leakage of water from the manifold or the removed cartridge. A replacement filter cartridge is quickly and easily mounted onto the manifold in the correct flow-coupled relation, again in a substantially drip-free manner, followed by return movement of the water supply valve to an open position for resumed water filtration.

One alternative preferred form of the invention is shown in FIGS. 10-13, wherein components corresponding with those shown and described in FIGS. 1-9 are identified by common reference numeral, and further wherein modified components are identified common reference numerals increased by 100. In general, the modified filter cartridge and manifold system or unit 110 shown in FIGS. 10-13 utilizes a modified water supply valve 118 that eliminates the need for separate manifold check valves such as the manifold check valves 62, 64 employed as shown in FIGS. 4-5.

The modified system 110 depicted in FIGS. 10-13 includes a modified manifold valve body 132 adapted for slide-fit seated support upon the bracket plate 23 having the forwardly protruding bracket arms 25 as previously described. The bracket arms 25 define upwardly presented and generally parallel cam rails 26 for supported engagement by the pair of laterally opposed, outwardly projecting cam pins or lugs 28 on the head 30 of the removable filter cartridge 16. As in the previous embodiment of FIGS. 1-9, the valve body 132 defines a pair of forwardly projecting inlet and outlet fittings 37, 38 (FIG. 12) for suitable slide-fit and flow-coupled engagement with a corresponding pair of inlet and outlet ports 39, 40 on the valve cartridge head 30.

A manifold cap 15 is pivotally mounted relative to the valve body 132 between a lowered position (FIG. 10) overlying and protectively concealing the manifold fittings 37, 38 as well as the upper end of the filter cartridge 16 while positioning a modified water supply valve 118 in a open position for water flow to and through the filter cartridge for purification. However, the manifold cap 15 can be elevated to the raised position (FIG. 11) for initially closing the water supply valve 118 and then exposing the upper end of the filter cartridge 16 for quick and easy slide-away removal and replacement.

The modified valve body 132 has an upstream end protruding axially from an upstream side of the manifold cap 15, wherein this upstream end extends into the cap interior to a stepped shoulder 74 (FIGS. 12-13) whereat the valve body 132 expands in diametric size for the balance of the length thereof. This larger diameter segment of the valve body 132 is structurally connected to or formed integrally with the bracket card 33 for secure and stable support on the bracket plate 23. A tubular valve member 144 of reduced diametric size is slidably fitted into the open end of this larger diameter segment of the valve body 132. The tubular valve member includes a radially open inlet valve port 162 formed in axially spaced relation with a radially open outlet valve port 164, with said valve ports 162, 164 being spaced for respective alignment with the inlet and outlet fittings 37, 38 on the valve body 132. A radially stepped-down upstream end of the valve member 144 defines a radial shoulder for engaging an internal shoulder at an upstream end of the larger diameter segment of the valve body 132, for normally aligning the valve ports 162, 164 with the inlet and outlet fittings 37, 38. An upstream segment of the valve member 144 defines the inlet bore 41 for receiving water inflow from a source or supply, and then turns radially for flow communication with the inlet valve port 162. A downstream segment of the valve member 144 defines the outlet bore with a radially turned end for flow communication with the outlet valve port 164. A pair of O-ring seals 75 or the like are captured about the valve member 144 at positions axially opposed to the outlet valve port 164.

Figure 10:
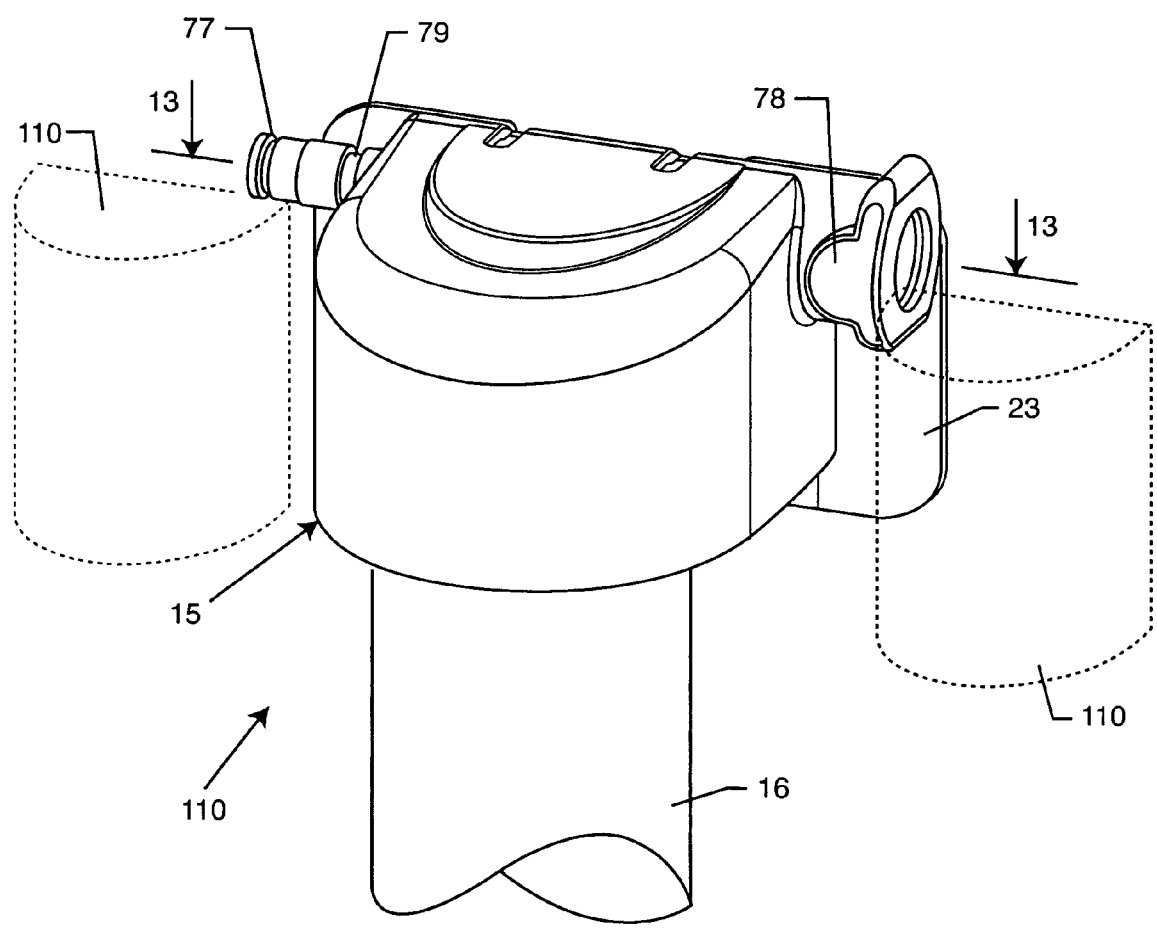
FIG. 10 is a fragmented front perspective view similar to FIG. 2, but depicting an alternative preferred form of the invention with a pivotally mounted manifold cap in a closed or lowered position supporting and retaining a filter cartridge in a normal operating position for filtering water.
Figure 11:
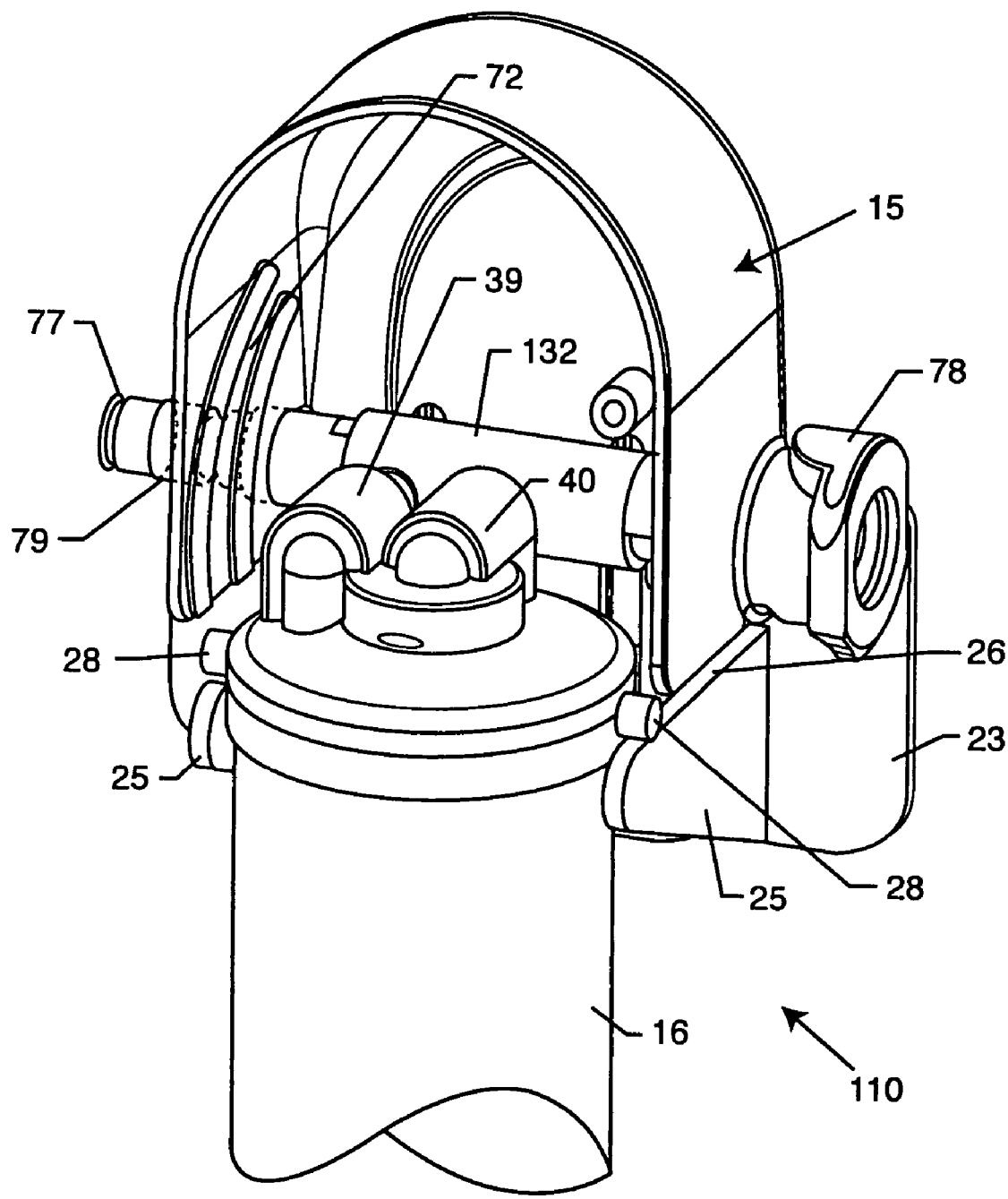
FIG. 11 is a fragmented front perspective view similar to FIG. 10, and showing the manifold cap in an open or raised position permitting filter cartridge removal and replacement.
Figure 12:
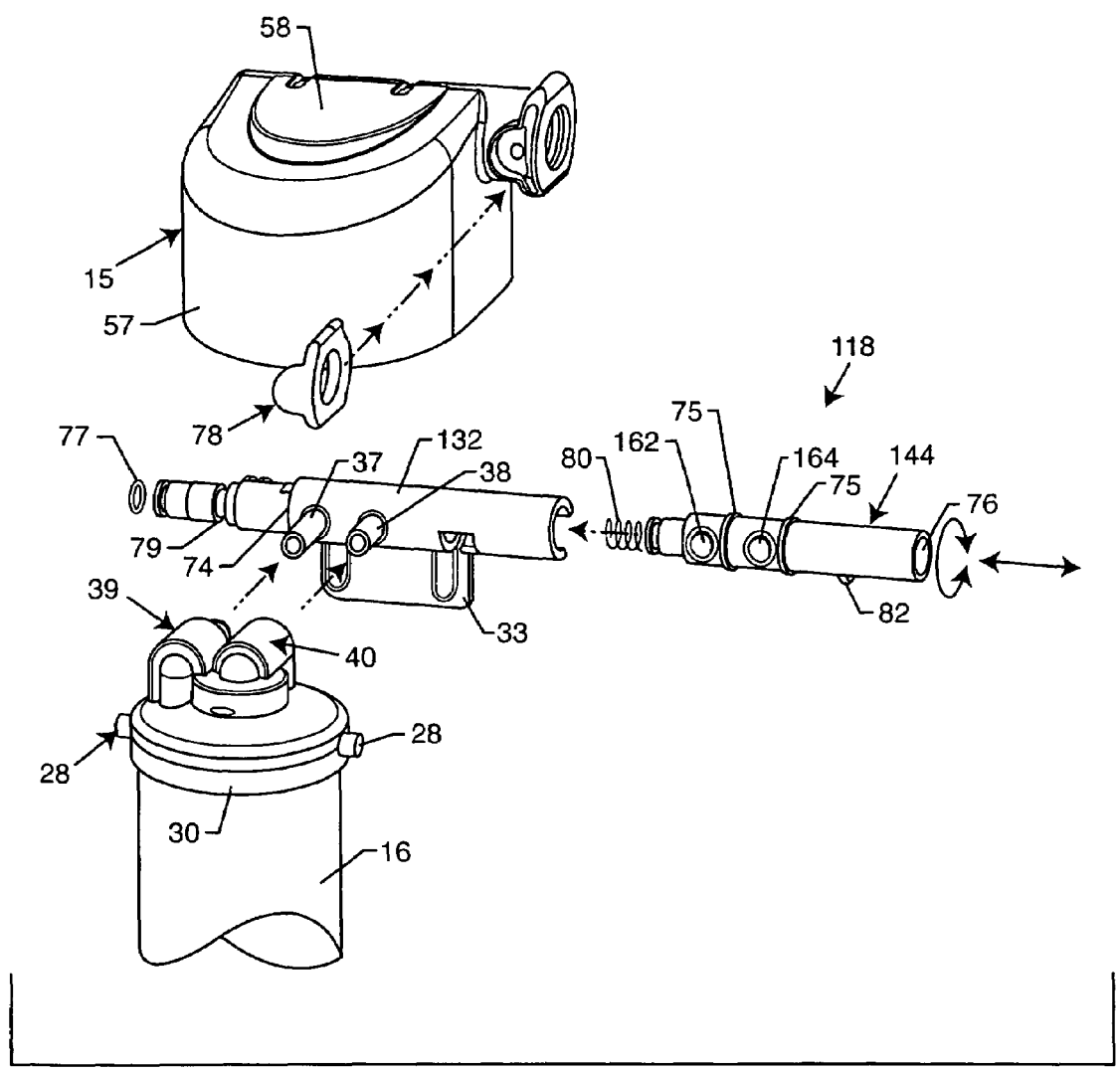
FIG. 12 is an exploded perspective view showing the manifold and filter cartridge components corresponding with the embodiment depicted in FIGS. 10-11.

In accordance with one aspect of the invention, the downstream or outlet end of the tubular valve member 144 defines a shallow counterbore 76 (FIGS. 12-13) for sealed slide-fit reception of an upstream end of the valve body 132 associated with a subsequent cartridge/manifold unit or system 110 (FIG. 10) in succession. Similarly, the upstream end of the valve body 132, which will typically carry an O-ring seal 77 (FIGS. 12-13) or the like, is sized for slide-fit and sealed reception into the downstream end of a prior cartridge/manifold unit or system 110 in succession (FIG. 10). A spring-loaded bayonet clip 78 is conveniently mounted on the mounting cap 15 for releasably engaging a circumferential groove 79 formed near an upstream end of the adjacent valve body 132, to releasably lock the successive stages of a resultant multi-cartridge purification system in series relation. Such spring-loaded bayonet clips 78 are known in the art for tubing connections, as disclosed, for example, in more detail in U.S. Pat. No. 4,436,125 which is incorporated by reference herein.

A spring 80 is desirably provided to react axially between an upstream end of the valve member 144 and another internal shoulder formed within the valve body 132 for axially biasing the valve member 144 toward a position with the valve ports 162, 164 misaligned with the inlet and outlet fittings 37, 38, when the subsequent stage of the purification system is removed or disassembled from the valve member counterbore 76. However, when the subsequent purification stage is assembled with the illustrated unit 110, the valve member 144 is axially shifted against the spring 80 for aligning the valve ports 162, 164 in the axial direction relative to the inlet and outlet fittings 37, 38.

Figure 13:
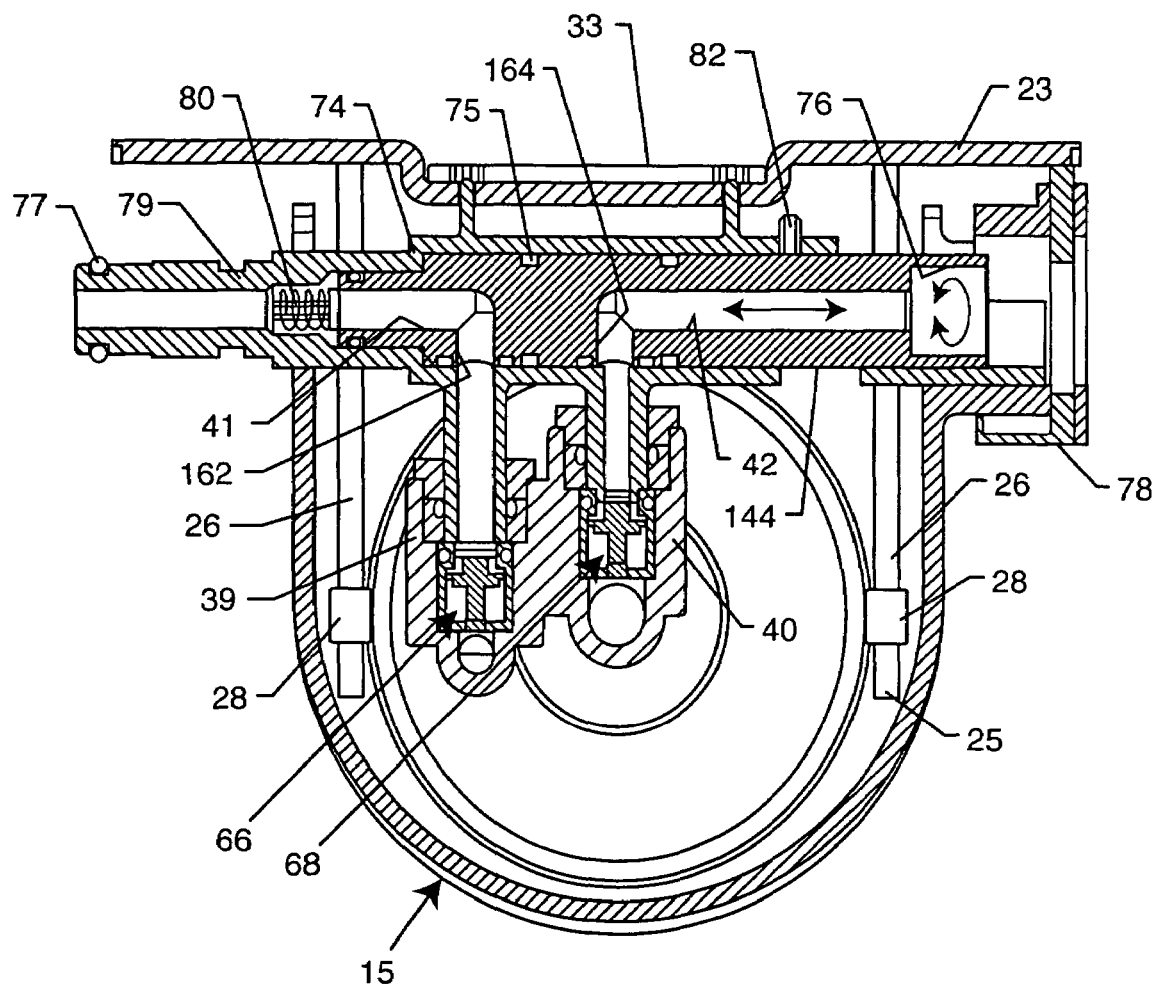
FIG. 13 is an enlarged horizontal sectional view taken generally on the line 13-13 of FIG. 10.
Figure 14:
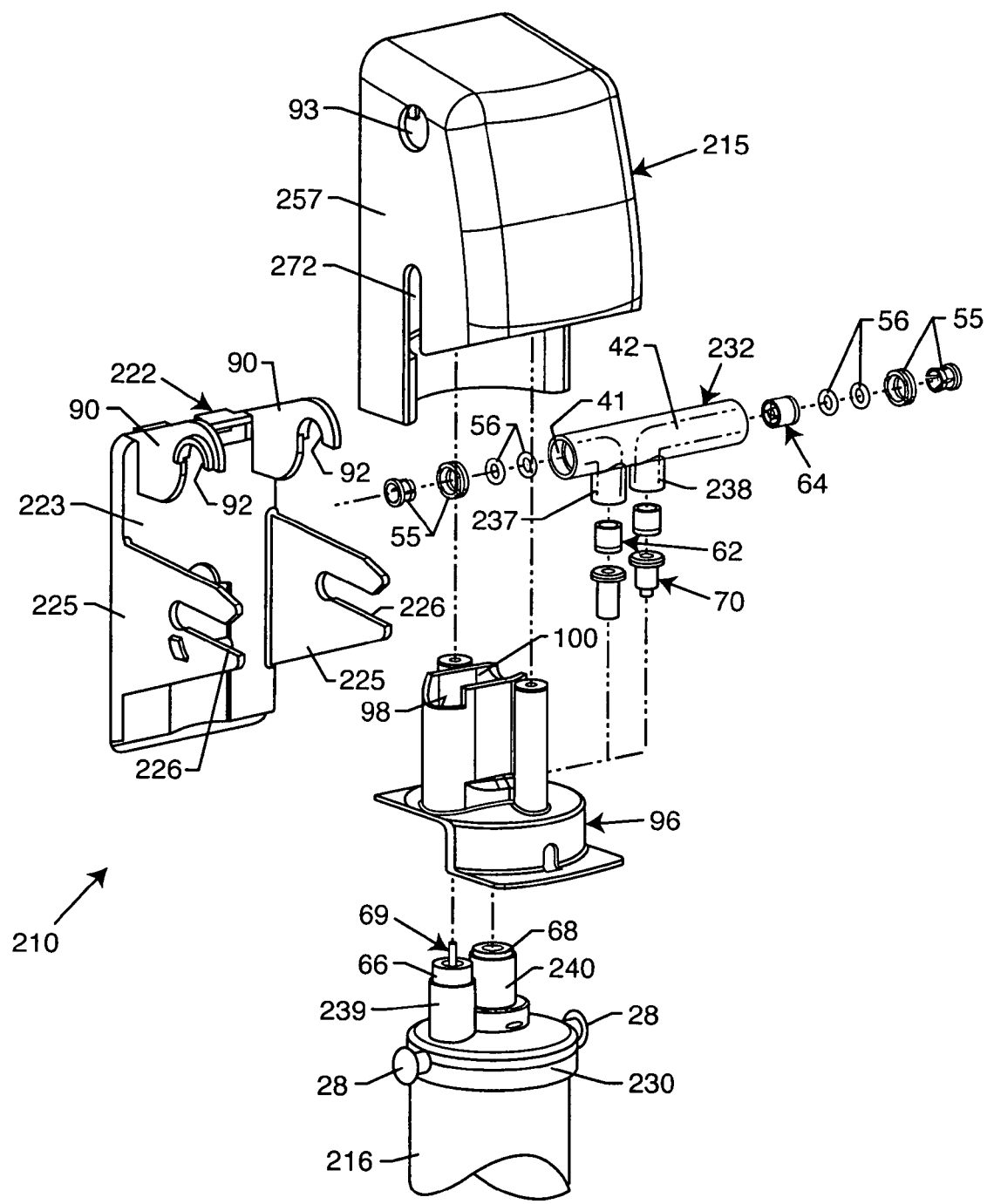
FIG. 14 is an exploded perspective view illustrating manifold and filter cartridge components in accordance with another alternative preferred form of the invention.

The tubular valve member 144 is rotatably shifted upon pivotal movement of the manifold cap 15 for moving the valve ports 162, 164 between an open position aligned radially with the manifold inlet and outlet fittings 37, 38 (as shown in FIG. 13), and a closed position with said valve ports 162, 164 opening generally upwardly in misalignment with the fittings 37, 38. Accordingly, in the open position, water within the inlet bore 41 is in flow communication with the inlet fitting 37 via the inlet valve port 162, for flow to the filter cartridge 16 through the inlet port 39 thereof. In this regard, in the embodiment of FIGS. 10-13, the actuator pin 69 (FIG. 4) on the cartridge inlet port 38 may be omitted in the absence of the first manifold check valve 60 (FIG. 4). In a similar manner, water from the cartridge outlet port 40 is in flow communication with the manifold outlet fitting 38 for flow to the subsequent purification stage or unit 110, and ultimately to a faucet valve or the like. The second manifold check valve 62 (FIG. 4) may also be omitted.

The mounting cap 15 is engaged by a radially protruding lug 82 on the valve member 144, for rotatably displacing the valve member as the cap 15 is raised and lowered. Importantly, the orientation of the valve member 144 and lug 82 relative to the cap 15 provides for alignment of the valve ports 162, 164 with the inlet fittings 37, 38 to place the water supply valve 124 in an open position when the cap is lowered over the valve body 132 and the filter cartridge coupled therewith (FIG. 10). As the cap 15 is raised (FIG. 11), the water supply valve 124 is initially closed by misalignment of the valve ports 162, 164 with the inlet fittings 37, 38, followed by exposure of the upper end of the filter cartridge for removal and replacement in the same manner as previously described. When a replacement filter cartridge 16 is in place, the manifold cap 15 can be pivoted back down to the lowered position (FIG. 10), the inlet and outlet ports 39, 40 are drawn by the cam tracks 76 engaging the cam pins 28 to draw the cartridge ports 39, 40 into proper slide-fit and flow-coupled engagement with the manifold fittings 37, 38, in the same manner as previously described, followed by re-opening of the water supply valve 118 for resumed filter operation. Importantly, removal and replacement of the filter cartridge 16 takes place in a substantially drip-free manner.

A further alternative preferred form of the invention is shown in FIGS. 14-19, wherein components corresponding with those shown and described in FIGS. 1-9 are again identified by common reference numerals, and further wherein modified components are identified common reference numerals increased by 200.

In general, the modified filter cartridge and manifold system or unit 210 shown in FIGS. 14-19 includes a modified filter cartridge 216 having a head 230 equipped with a pair of laterally opposed cam lugs or cam pins 28, in combination with a pair of inlet and outlet ports 239 and 240 having the first and second cartridge check valves 66 and 68 installed therein. In addition, as previously shown and described, the first cartridge check valve 66 at the inlet port 239 includes an outwardly protruding actuator pin or probe 69. The orientation of the cartridge inlet and outlet ports 239, 240 is modified from the configuration shown and described in FIGS. 1-13, in that the cartridge inlet and outlet ports 239, 240 extend axially upwardly in parallel spaced relation from the cartridge head 230.

The cartridge inlet and outlet ports 239, 240 are oriented for slide-fit, push-on coupling with a corresponding pair of inlet and outlet fittings 237 and 238 which protrude radially outwardly in parallel spaced relation from a tubular valve body 232. In general, this tubular valve body 232 conforms with the valve body 32 shown and described in the embodiment of FIGS. 1-9, except that the separate water supply valve 18 and its rotary drive coupling with a manifold cap is omitted. The tubular valve body 232 does include a pair of collet-style couplers 55 including O-ring seals 56 at the upstream and downstream ends thereof for respective slide-in coupling with the adjacent ends of the water supply conduit or tube 19 (not shown in FIGS. 14-19). An upstream end segment of the valve body 232 defines an inlet bore 41 for water supply flow communication with the radially out-turned inlet fitting 237 that has the first manifold check valve 62 mounted therein. A downstream segment of the valve body 232 defines the outlet bore 42 for coupling the outlet fitting 238 with the faucet or the like, with the second manifold check valve 64 mounted within said outlet bore 42. An annular actuator nipple or stem 70 is formed at a distal end tip of the outlet fitting 238.

The tubular valve body 232 is movably mounted on a modified support bracket 222 for rotary movement with a modified manifold cap 215 as the filter cartridge 216 is installed or removed for replacement. This modified support bracket 222 is shown best in FIG. 14 to include rear bracket plate 223 having an upper pair of forwardly projecting bearing arms 90 defining a downwardly open pair of axially spaced and generally part-circle bearing seats 92 for rotatably receiving and engaging the tubular valve body 232 near the axially opposed ends thereof. The support bracket 222 further includes a lower pair of forwardly projecting bracket arms 225 defining a forwardly open pair of generally horizontally oriented cam slots or tracks 226.

The valve body 232 is fitted against the downwardly open bearing seats 232 defined by the bearing arms 90, and the modified mounting cap 215 is mounted over the valve body so that the axially opposed valve body ends protrude at least a short distance through openings 93 formed in the opposed side walls of the 257 of the cap. In this position, a central portion of the valve body 232 is nested upwardly against an internal bearing seat 94 (FIG. 16) formed on the underside of the cap top wall 258. An inner cap shell 96 is then assembled with the cap 215 as by means of a pair of screws 97 or the like fastened upwardly into the cap top wall 258 (shown best in FIG. 16), so that a part-circle bearing cradle 98 (FIG. 14) defined by an upper surface of the inner shell 96 engages and retains the valve body 232 securely against the cap bearing seat 94. With this assembly of components, the manifold cap 215 is rotatably mounted on the support bracket 222, and the tubular valve body 232 is carried by the manifold cap 215 for rotation therewith. Importantly, the manifold cap 215 is rotatable generally about a central axis of the valve body 232, whereby the valve body 232 is rotatable about the central axis thereof.

The inner cap shell 96 carried by the manifold cap 215 additionally defines a downwardly open, generally oval-shaped passage 100 having the radially projecting manifold inlet and outlet fittings 237, 238 positioned therein, and adapted further for slide-fit reception of the upwardly projecting inlet and outlet ports 239, 240 on the filter cartridge 216. Thus, the filter cartridge 216 can be oriented for slide-in reception of the inlet and outlet ports 239, 240 into this passage 100, for appropriate respective engagement with the manifold inlet and outlet fittings 237, 238. In accordance with one important aspect of the invention, such slide-fit engagement of these inlet/outlet fittings 237, 238 and ports 239, 240 functions as previously described with respect to FIGS. 1-9 to permit water inflow to the cartridge 216 via the first manifold and first cartridge check valves 62, 66, and also to permit water outflow from the cartridge via the second cartridge and second manifold check valves 68, 64. However, in the unassembled state, the first and second manifold check valves 62, 64 prevent water outflow from the manifold fittings 237, 238, whereas the first and second cartridge check valves prevent water outflow from the cartridge ports 239, 240.

The manifold cap 215 further defines a downwardly open pair of vertically elongated cam tracks 272 formed in the opposed side walls 257 thereof, for slide-fit guided reception of the cam pins 28 on the filter cartridge 216. In this regard, initial filter cartridge installation is performed by initially pivoting the manifold cap 215 about the axis of the valve body 232 toward a partially raised, angularly outward orientation as viewed in FIG. 15. This partially raised cap position is sufficient for the cap cam tracks 272 to clear the forward or distal ends of the bracket cam tracks 226, and thereby accommodate unobstructed upwardly slide-in reception of the cartridge cam pins 28.

Figure 15:
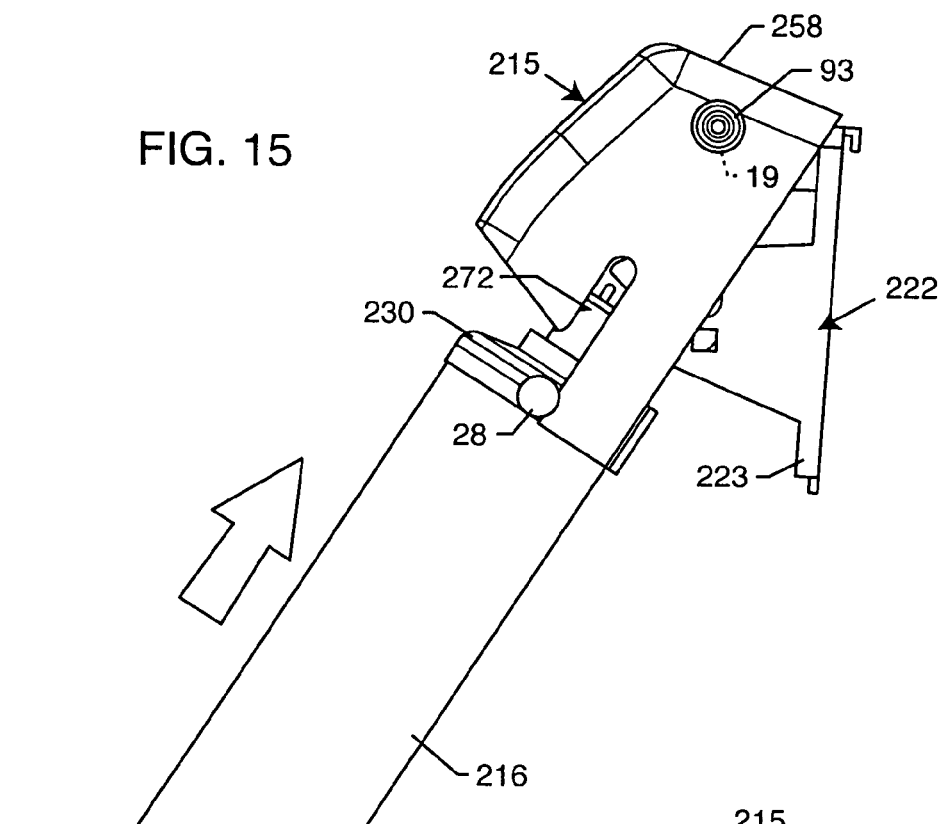
FIG. 15 is a side elevation view illustrating initial engagement of the filter cartridge of FIG. 14 with the manifold.
Figure 16:
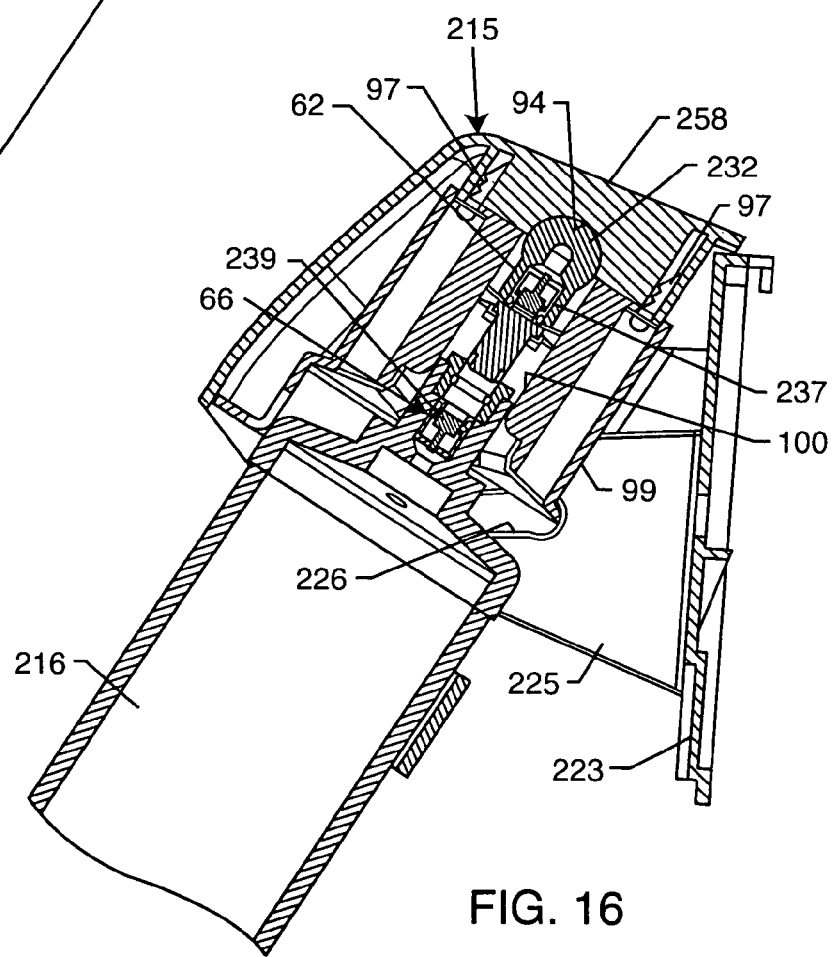
FIG. 16 is an enlarged fragmented vertical sectional view illustrating initial engagement of the filter cartridge of FIGS. 14-15 with the manifold.
Figure 17:
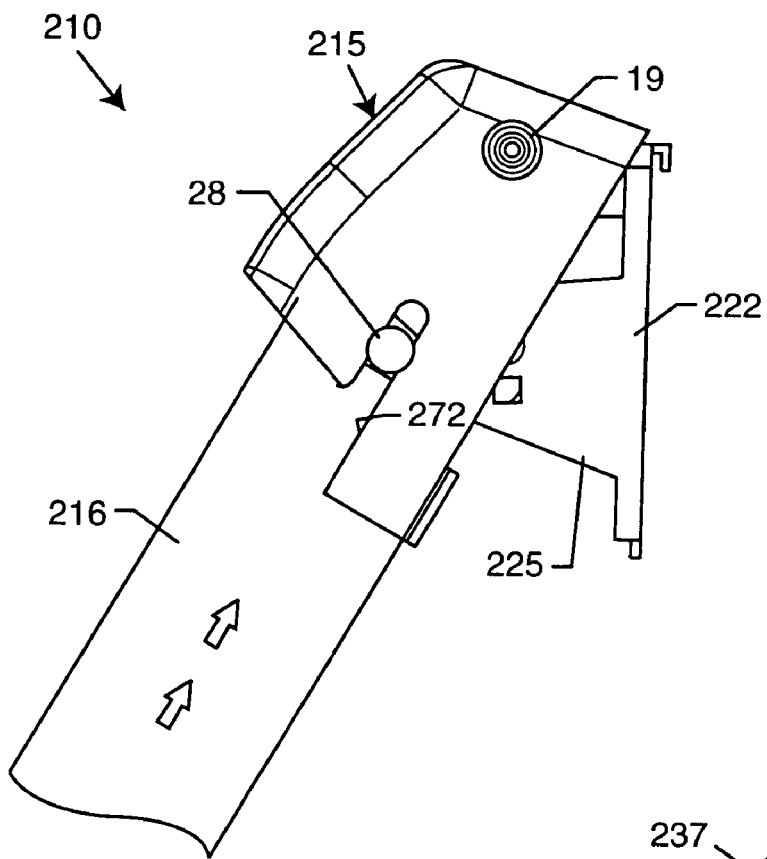
FIG. 17 is a side elevation view similar to FIG. 15, but showing further engagement of the filter cartridge with the manifold.

Movement of the manifold cap 215 to this partially raised position shown in FIG. 15 also rotatably displaces the inner cap shell 96 for orienting the guide passage 100 formed therein for slide-in reception of the upwardly projecting inlet and outlet ports 239, 240 on the filter cartridge 216, concurrently with slide-fit reception of the cam pins 28 into the cap cam tracks 272. Importantly, in this partially assembled position, the inlet/outlet ports 239, 240 on the filter cartridge 216 are properly aligned with the manifold inlet/outlet fittings 237, 238 for slide-fit coupling therewith, as viewed in FIG. 16. Subsequent push-in displacement of the filter cartridge 216 (FIG. 17) to displace the cam pins 28 generally upwardly along the cap cam tracks 272 thus also moves the cartridge inlet/outlet ports 239, 240 toward flow-coupled engagement with the manifold inlet/outlet fittings 237, 238.

As the filter cartridge 216 is push-fit assembled with the manifold cap 215, so that the cartridge cam pins 28 reach the uppermost ends of the cap cam tracks 272 is accompanied by alignment of the cam pins 28 with the open distal ends of the bracket cam tracks 226. Accordingly, as viewed in FIGS. 18-19, the filter cartridge 216 can then be pivotally displaced to swing a lower end thereof toward the bracket plate 222 (or the wall upon which the bracket plate is mounted) in the direction of arrow 102 in FIG. 18, thereby displacing the cartridge cam pins 28 along the bracket cam tracks 226. Importantly, in the course of the final swinging movement of the filter cartridge 216, the bracket cam tracks 226 force the cartridge cam pins 28 in a direction causing the cartridge inlet/outlet ports 239, 240 to be firmly and properly engaged in flow-coupled relation with the manifold inlet/outlet fittings 237, 238. With this arrangement, the sets of check valves 62, 64 and 66, 68 open substantially simultaneously so that the filter cartridge 216 is installed substantially in a drip-free manner. When the cartridge cam pins 28 reach the inboard ends of the bracket cam tracks 226, the manifold cap 215 (which is pivotally rotated with the cartridge toward a substantially vertical position) is oriented with the cap cam tracks 272 in a substantially vertical orientation. Thus, the cartridge cam pins 28 are retained cooperatively by the substantially vertical cap cam tracks 272 and the substantially horizontal bracket cam tracks 226, resulting in effective locked retention of the filter cartridge 216 in the upright, operational position as viewed in FIGS. 18-19.

Figure 18:
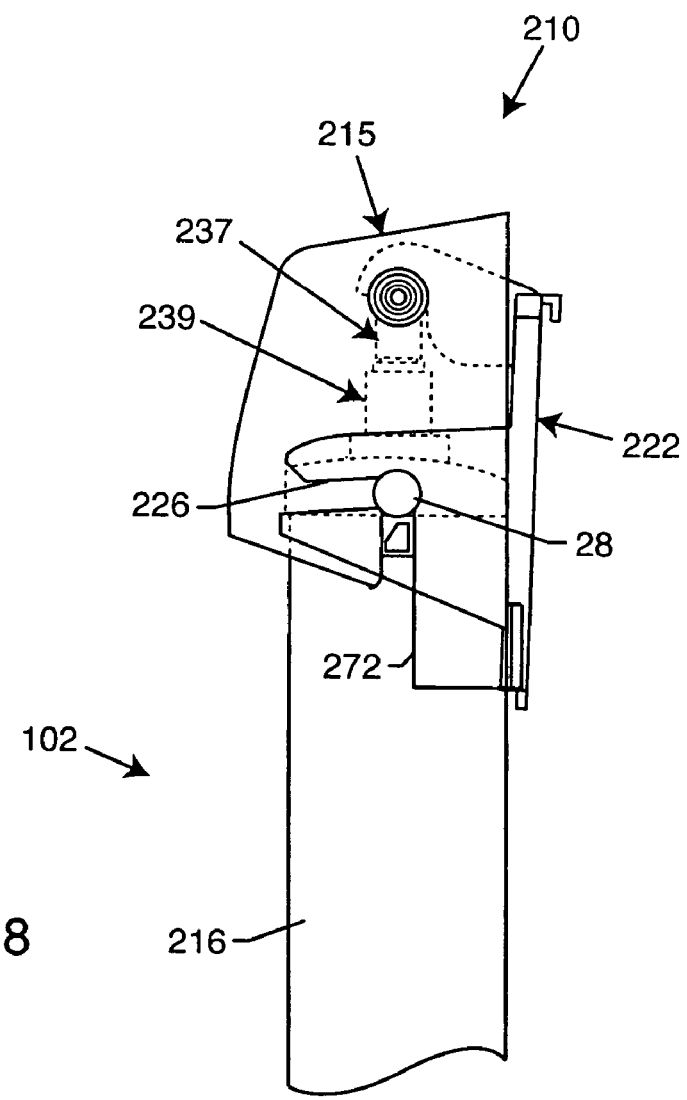
FIG. 18 is a side elevation view similar to FIGS. 15 and 17, but depicting final engagement of the filter cartridge with the manifold.
Figure 19:
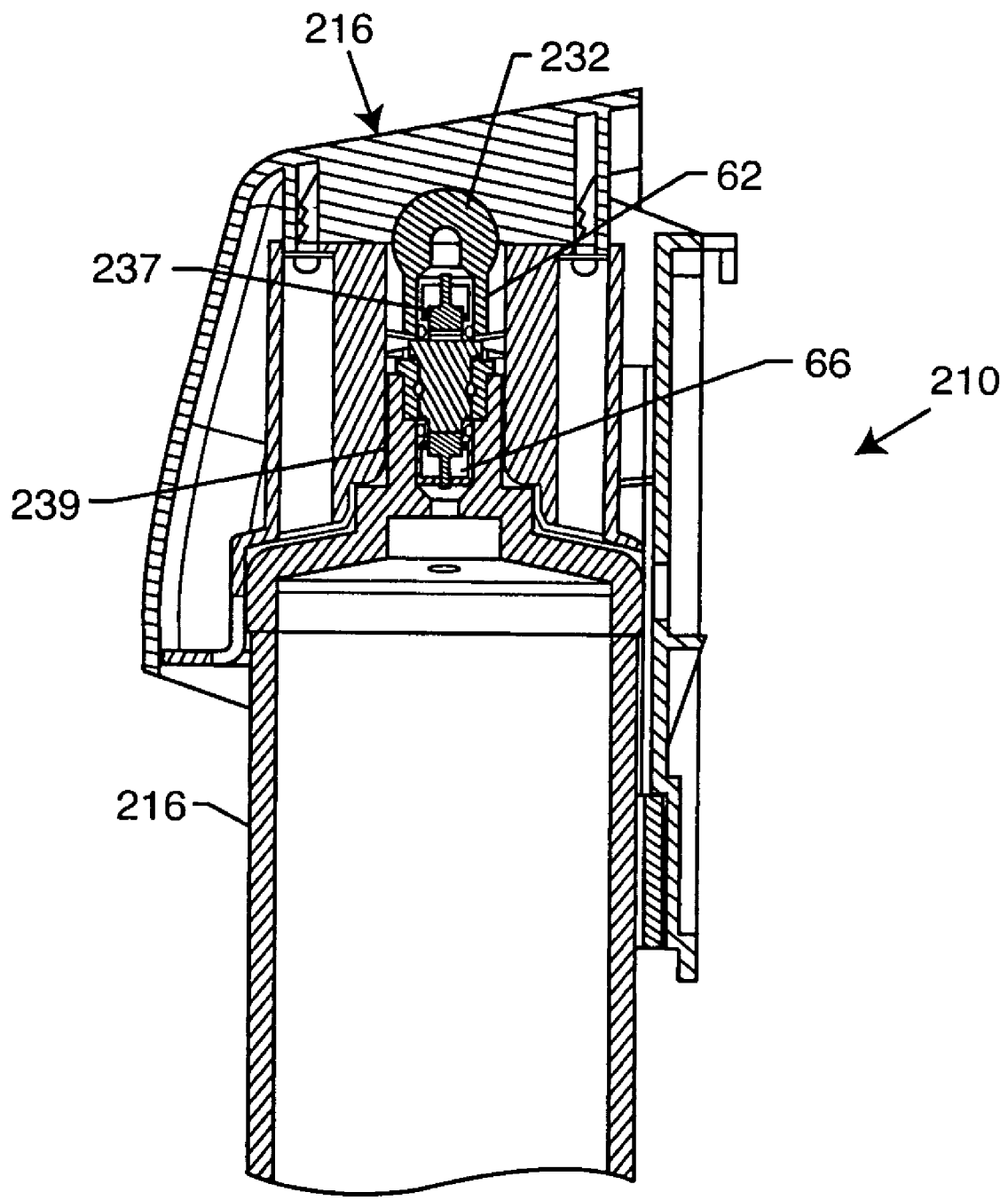
FIG. 19 is an enlarged fragmented vertical sectional view illustrating final engagement of the filter cartridge of FIG. 18 with the manifold.

Subsequent manual replacement of the filter cartridge 216 is performed by initially swinging the lower end of the cartridge outwardly from the bracket plate 222 (or the wall upon which the bracket plate is mounted), in a direction opposite to arrow 102 in FIG. 18. Such movement concurrently pivots the manifold cap 215 in the same direction, and causes the cartridge cam pins 28 to ride outwardly along the bracket cam tracks 226 accompanied by closures of the sets of check valves 62, 64 and 66, 68. When the cam pins 28 clear the outermost ends of the bracket cam tracks 226, the filter cartridge 216 can be pulled downwardly with the cam pins 28 guiding along the cap cam tracks 272 as the cartridge is separated from the cap. Then, a replacement filter cartridge 216 can be quickly and easily installed in the manner previously described. Importantly, such cartridge removal also takes place in a substantially drip-free manner.

A variety of further modifications and improvements in and to the improved filter cartridge and manifold system 10 of the present invention will be apparent to those persons skilled in the art. Accordingly, no limitation on the invention is intended by way of the foregoing description and accompanying drawings, except as set forth in the appended claims.

What is claimed is:

1. A combined filter cartridge and manifold for a water purification system, comprising:
    a manifold adapted for connection to a water supply, said manifold including a water supply valve, inlet and outlet fittings, and a manifold cap coupled to said water supply valve and movable between first and second positions respectively closing and opening said water supply valve;
    a filter cartridge having an upper end including inlet and outlet ports adapted for respective coupling with said manifold inlet and outlet fittings;
    said manifold and said filter cartridge further including interengageable means for retaining said cartridge inlet and outlet ports in secure coupled relation respectively with said manifold inlet and outlet fittings prior to opening of said water supply valve upon movement of said manifold cap from said first position to said second position, and for closing said water supply valve prior to permitting uncoupling of said cartridge inlet and outlet ports respectively from said manifold inlet and outlet fittings upon movement of said manifold cap from said second position to said first position;
    said filter cartridge including check valves mounted at said filter cartridge inlet and outlet ports, and said manifold including check valves mounted at said manifold inlet and outlet fittings; and
    an actuator pin carried at said filter cartridge inlet port for engaging and opening said check valve at said manifold inlet fitting, and an actuator nipple carried at said manifold outlet fitting for engaging and opening said check valve at said filter cartridge outlet port, when said filter cartridge is assembled with said manifold and said manifold cap is in said second position.

2. The combined filter cartridge and manifold of claim 1 wherein said manifold comprises a manifold bracket having said water supply valve mounted thereon, and said manifold cap being pivotally mounted on said manifold bracket.

3. The combined filter cartridge and manifold of claim 2 wherein said manifold bracket comprises a bracket plate, and a valve body slide-fit assembled therewith, said valve body including said water supply valve and said inlet and outlet fittings.

4. The combined filter cartridge and manifold of claim 2 wherein said manifold cap has a top wall and side walls defining a downwardly open construction for substantially overlying and concealing said filter cartridge upper end when said filter cartridge is assembled with said manifold and said manifold cap is in said second position.

5. The combined filter cartridge and manifold of claim 1 wherein said interengageable means comprises at least one cam pin on said filter cartridge, and at least one cam track on said manifold cap engageable with said cam pin.

6. The combined filter cartridge and manifold of claim 1 wherein said manifold includes means for assembly with at least one additional manifold in series-connected relation.

7. A combined filter cartridge and manifold for a water purification system, comprising:
   a manifold adapted for connection to a water supply, said manifold including a manifold bracket having water supply valve mounted thereon, inlet and outlet fittings, and a manifold cap pivotally mounted on said manifold bracket and coupled to said water supply valve and movable between first and second positions respectively closing and opening said water supply valve; and
   a filter cartridge having an upper end including inlet and outlet ports adapted for respective coupling with said manifold inlet and outlet fittings;
   said manifold and said filter cartridge further including interengageable means for retaining said cartridge inlet and outlet ports in secure coupled relation respectively with said manifold inlet and outlet fittings prior to opening of said water supply valve upon movement of said manifold cap from said first position to said second position, and for closing said water supply valve prior to permitting uncoupling of said cartridge inlet and outlet ports respectively from said manifold inlet and outlet fittings upon movement of said manifold cap from said second position to said first position;
   said interengageable means comprising at least one cam rail on said manifold bracket, at least one cam pin on said filter cartridge and engageable with said cam rail, and at least one cam track on said manifold cap and engageable with said cam pin for carrying said cam pin along said cam rail upon movement of said manifold cap between said first and second positions.

8. The combined filter cartridge and manifold of claim 7 wherein said at least one cam rail comprises a pair of said cam rails, wherein said at least one cam pin comprises a pair of said cam pins respectively engageable with said pair of cam rails, and wherein said at least one cam track comprises a pair of said cam tracks respectively engageable with said pair of cam pins.

9. A combined filter cartridge and manifold for a water purification system, comprising:
   a manifold adapted for connection to a water supply, said manifold including a manifold bracket having a water supply valve mounted thereon and further defining inlet and outlet fittings, and a manifold cap pivotally mounted on said manifold bracket and coupled to said water supply valve, said manifold cap being movable between a first position closing said water supply valve and a second position opening said water supply valve;
   a filter cartridge having inlet and outlet ports carried generally at an upper end thereof and adapted for respective coupling with said manifold inlet and outlet fittings, said filter cartridge further including check valves mounted at said inlet and outlet ports;
   said manifold and said filter cartridge further including interengageable means for retaining said cartridge inlet and outlet ports in secure coupled relation respectively with said manifold inlet and outlet fittings prior to opening of said water supply valve upon movement of said manifold cap from said first position to said second position, and for closing said water supply valve prior to permitting uncoupling of said cartridge inlet and outlet ports respectively from said manifold inlet and outlet fittings upon movement of said manifold cap from said second position to said first position;
   check valve means mounted generally at said manifold inlet and outlet fittings; and
   an actuator pin carried at said filter cartridge inlet port for engaging and opening said check valve means at said manifold inlet fitting, and an actuator nipple carried at said manifold outlet fitting for engaging and opening said check valve at said filter cartridge outlet port, when said filter cartridge is assembled with said manifold and said manifold cap is in said second position.

10. The combined filter cartridge and manifold of claim 9 wherein said manifold cap has a top wall and side walls defining a downwardly open construction for substantially overlying and concealing said filter cartridge upper end when said filter cartridge is assembled with said manifold and said manifold cap is in said second position.

11. The combined filter cartridge and manifold of claim 9 wherein said manifold includes means for assembly with at least one additional manifold in series-connected relation.

12. A combined filter cartridge and manifold for a water purification system, comprising:
   a manifold adapted for connection to a water supply, said manifold including a manifold bracket having a water supply valve mounted thereon and further defining inlet and outlet fittings, and a manifold cap pivotally mounted on said manifold bracket and coupled to said water supply valve, said manifold cap being movable between a first position closing said water supply valve and a second position opening said water supply valve; and
   a filter cartridge having inlet and outlet ports carried generally at an upper end thereof and adapted for respective coupling with said manifold inlet and outlet fittings, said filter cartridge further including check valves mounted at said inlet and outlet ports;
   said manifold and said filter cartridge further including interengageable means for retaining said cartridge inlet and outlet ports in secure coupled relation respectively with said manifold inlet and outlet fittings prior to opening of said water supply valve upon movement of said manifold cap from said first position to said second position, and for closing said water supply valve prior to permitting uncoupling of said cartridge inlet and outlet ports respectively from said manifold inlet and outlet fittings upon movement of said manifold cap from said second position to said first position;
   said interengageable means comprising at least one cam rail on said manifold bracket, at least one cam pin on said filter cartridge and engageable with said cam rail, and at least one cam track on said manifold cap and engageable with said cam pin for carrying said cam pin along said cam rail upon movement of said manifold cap between said first and second positions.

13. A combined filter cartridge and manifold for a water purification system, comprising:
   a manifold adapted for connection to a water supply, said manifold including a manifold bracket, a valve body defining inlet and outlet fittings each including first valve means, and a manifold cap pivotally mounted with respect to said manifold bracket and movable between a first position and a second position relative to said manifold bracket; and a filter cartridge having inlet and outlet ports carried generally at an upper end thereof and adapted for respective coupling with said manifold inlet and outlet fittings, said filter cartridge further including second valve means mounted at said inlet and outlet ports;

said manifold and said filter cartridge further including interengageable means for retaining said cartridge inlet and outlet ports in secure coupled relation respectively with said manifold inlet and outlet fittings upon movement of said manifold cap from said first position to said second position, and for permitting uncoupling of said cartridge inlet and outlet ports respectively from said manifold inlet and outlet fittings upon movement of said manifold cap from said second position to said first position;

said interengageable means comprising at least one cam pin on said filter cartridge, at least one cam track on said manifold cap, and at least one cam rail on said manifold bracket, said filter cartridge inlet and outlet ports being oriented for push-fit alignment respectively with said manifold inlet and outlet fittings upon sliding displacement of said at least one cam pin along said at least one cam track when said manifold cap is in said first position, said at least one cam pin being thereupon aligned and engageable with said at least one cam rail for sliding displacement therealong to permit pivotal movement of said manifold cap from said first position to said second position and for correspondingly displacing said filter cartridge inlet and outlet ports into secure coupled relation respectively with said manifold inlet and outlet fittings.

14. The combined filter cartridge and manifold of claim 13 wherein said at least one cam pin comprises a pair of said cam pins, wherein said at least one cam track comprises a pair of said cam tracks, and wherein said at least one cam rail comprises a pair of said cam rails.

15. The combined filter cartridge and manifold of claim 13 wherein said valve body is movably carried by said manifold bracket for rotatable movement with said manifold cap between said first and second positions.

16. The combined filter cartridge and manifold of claim 13 wherein said at least one cam track on said manifold cap extends generally vertically when said manifold cap is in said second position, and further wherein said at least one cam rail on said manifold bracket extends generally horizontally.

17. The combined filter cartridge and manifold of claim 13 wherein said manifold cap has a top wall and side walls defining a downwardly open construction for substantially overlying and concealing said filter cartridge upper end when said filter cartridge is assembled with said manifold cap.

18. The combined filter cartridge and manifold of claim 13 wherein said filter cartridge inlet and outlet ports extend axially upwardly from said filter cartridge upper end in generally parallel spaced relation.

19. The combined filter cartridge and manifold of claim 13 wherein said first valve means at said inlet and outlet fittings comprises a first pair of check valves, and further wherein said second valve means at said inlet and outlet ports comprises a second pair of check valves.

20. A combined filter cartridge and manifold for a water purification system, comprising:

a manifold adapted for connection to a water supply, said manifold including a manifold bracket, a valve body defining inlet and outlet fittings each including first valve means, and a manifold cap pivotally mounted with respect to said manifold bracket and movable between a first position and a second position relative to said manifold bracket;

an elongated filter cartridge for containing a selected purification media, said filter cartridge having a head at one end thereof, said cartridge head including inlet and outlet ports, and second valve means mounted respectively at said inlet and outlet ports; and interengageable means for retaining said cartridge inlet and outlet ports in secure coupled relation respectively with said manifold inlet and outlet fittings upon movement of said manifold cap from said first position to said second position, and for permitting uncoupling of said cartridge inlet and outlet ports respectively from said manifold inlet and outlet fittings upon movement of said manifold cap from said second position to said first position;

said interengageable means comprising at least one cam rail on said manifold bracket, at least one cam pin on said filter cartridge and engageable with said cam rail, and at least one cam track on said manifold cap and engageable with said cam pin for carrying said cam pin along said cam rail upon movement of said manifold cap between said first and second positions.

21. The combined filter cartridge and manifold of claim 20 wherein said first valve means at said inlet and outlet fittings comprises a first pair of check valves, and further wherein said second valve means at said inlet and outlet ports comprises a second pair of check valves.

* * * * *